(12) United States Patent
Jones, Jr et al.

(10) Patent No.: US 11,767,960 B2
(45) Date of Patent: Sep. 26, 2023

(54) LED HEADLAMP SYSTEM WITH BRIGHTNESS CONTROL

(71) Applicant: Metra Electronics Corporation, Holly Hill, FL (US)

(72) Inventors: William H. Jones, Jr, Holly Hill, FL (US); Edward Robertson, Holly Hill, FL (US); William Lauer, Holly Hill, FL (US); Jason Anderson, Holly Hill, FL (US); John Wiley Horton, Tallahassee, FL (US)

( * ) Notice: Subject to any disclaimer, the term of this patent is extended or adjusted under 35 U.S.C. 154(b) by 0 days.

(21) Appl. No.: 17/470,006

(22) Filed: Sep. 9, 2021

(65) Prior Publication Data

US 2023/0075371 A1 Mar. 9, 2023

(51) Int. Cl.
| | |
|---|---|
| *F21S 41/663* | (2018.01) |
| *F21S 41/143* | (2018.01) |
| *F21S 41/33* | (2018.01) |
| *F21V 23/06* | (2006.01) |
| *F21S 41/153* | (2018.01) |
| *F21Y 115/10* | (2016.01) |
| *F21S 41/255* | (2018.01) |

(52) U.S. Cl.
CPC ............ *F21S 41/663* (2018.01); *F21S 41/143* (2018.01); *F21S 41/332* (2018.01); *F21V 23/06* (2013.01); *F21S 41/153* (2018.01); *F21S 41/255* (2018.01); *F21Y 2115/10* (2016.08)

(58) Field of Classification Search
CPC ........ F21S 41/663; F21S 41/332; F21S 41/143
See application file for complete search history.

(56) References Cited

U.S. PATENT DOCUMENTS 11,021,095 B2 * 6/2021 Spenner et al. ........ H05B 45/00

* cited by examiner

*Primary Examiner* — Matthew J. Peerce
(74) *Attorney, Agent, or Firm* — J. Wiley Horton

(57) ABSTRACT

A headlamp illumination source that switches from a first configuration conforming to on-road illumination standards to a second configuration that does not conform to on-road illumination standards. The switching is preferably controlled by a wireless signal but in some embodiments the switching can be controlled by a hard-wired signal or by a switch proximate the illumination source itself.

16 Claims, 22 Drawing Sheets

LED HEADLAMP SYSTEM WITH BRIGHTNESS CONTROL

BACKGROUND OF THE INVENTION

1. Field of the Invention

This invention relates to the field of vehicle lighting. More specifically, the invention comprises an LED-based headlamp system with user-adjustable brightness and/or pattern settings.

2. Description of the Related Art

The present invention takes advantage of recent advances in illumination sources for vehicle lighting. A brief explanation of the existing state of lighting technology will aid the reader's understanding. This is particularly true because the preferred embodiments of the present invention are configured to be "retrofitted" into existing headlamp assemblies. These preferred embodiments simply replace an existing headlamp bulb. Thus, the preferred embodiments must be compatible with and make suitable use of the prior art components in the headlamp assembly.

FIG. 1 depicts a prior art vehicle 10 having a pair of headlamp assemblies 12. A headlamp assembly generally includes an illumination source and a combination of focusing devices intended to create a desired beam pattern. The focusing devices at present are divided into reflector assemblies and projector assemblies. FIGS. 2-8 illustrate a typical reflector assembly. FIGS. 9 and 10 illustrate differences introduced by the use of a projector assembly.

FIG. 2 shows a sectional elevation view of a reflector headlamp assembly. Illumination source 14 is electrically powered via OEM wiring harness 18. The illumination source is often a filament contained within a clear housing filled with halogen gas. This type of illumination source is commonly called a "halogen bulb." Illumination in this case comes from the brightly glowing filament.

Reflector 16 is placed around illumination source 14. The reflector is shaped so that light rays coming from illumination source 14 are reflected forward (in front of the vehicle) in a desired pattern. It is desirable to reflect rays 22 forward in a direction that is approximately parallel to axis A-A. For an idealized point source of illumination, the optimum shape for reflector 16 is a parabola with illumination source 14 being located at the focus of the parabola.

FIG. 3 shows a detailed elevation view of a prior art halogen illumination source 14. Enclosure 17 is a clear glass cylinder containing a shielding gas. Base 24 is configured to physically attach the bulb to the headlamp assembly (and provides electrical connections, etc.). End occluder 60 is an opaque region across the end of the bulb that faces forward along the road. The presence of the end occluder means that a viewer in the path of the projected headlamp beam cannot directly see the filament. The filament itself is an intensely bright "point source" that can dazzle an oncoming driver. The end occluder ensures that the projected beam includes only reflected rays.

The example shown in FIG. 3 is a "dual beam" bulb which is configured to produce a "high beam" illumination source and a "low beam" illumination source (Under European nomenclature the "high beam" is known as a "main beam" and the "low beam" is known as a "dip beam"). High beam filament 26 is a tight coil of exposed electrical conductor. When current is flowing through this filament it produces a bright cylinder of light. Typical dimensions for the coil are an outer diameter of 2.0 mm and a length of 9.0 mm.

Low beam filament 28 is comparable to high beam filament 26, but is located further forward in enclosure 17. Shroud 30 is positioned underneath — and somewhat around the sides — of low beam filament 28. In a dual beam bulb, only one filament is energized at a time. Such a bulb usually has three states: (1) off, (2) high beam, and (3) low beam.

FIGS. 2 and 4 illustrate the interaction of the two filaments with the stationary reflector 16. High beam filament 26 is placed at the focus of parabolic reflector 16 - or very nearly so. FIG. 2 shows the light path when the high beam filament is energized. Because the high beam filament rests at the focus of the parabolic reflector, light rays emanating from the high beam filament are reflected outward as parallel rays 22. The focusing is not perfect — the filament not being a true point source — but the rays thus projected do not rapidly diverge. The reader will observe how rays 22 are projected forward in a direction that is parallel to axis A-A.

The operation of low beam filament 28 is different. FIG. 4 illustrates the light path when the low beam filament is energized. Low beam filament 28 is located further forward along axis A-A with respect to high beam filament 26. It is thus forward of the focus of reflector 16. Rays traveling upward from low beam filament 28 thus strike reflector 16 at an angle that is steeper than the rays coming from the high beam filament ("steeper" meaning closer to perpendicular to the surface of the reflector at the point of reflection). As a result, rays 32 are reflected downward with respect to the horizontal axis A-A.

Of course, if all the light emanating from low beam filament 28 were allowed to escape, rays traveling downward from the filament would be reflected upward with respect to axis A-A. For this reason, shroud 30 is provided to block rays emanating downward. A portion of the shroud also blocks certain lateral rays.

In studying FIGS. 2 and 4, the reader will appreciate that the high beam filament produces a focused beam that is projected approximately parallel to axis A-A. The reader will also appreciate that the low beam filament — in conjunction with shroud 30 — projects a less focused beam that is directed downward with respect to axis A-A. The high beam is configured to project light well down the road. The low beam is configured to project light onto the road surface in front of the vehicle without blinding oncoming drivers.

Many years ago, headlamp assemblies tended to be round objects in which reflector 16 was a radially symmetric surface (revolved about axis A-A). This functioned well for the projection of a cylindrical beam, but a cylindrical beam is not an ideal projection pattern. Projected light is not needed significantly above or below the horizontal. The light is needed in a band close to the horizontal. A rectangular projection is preferred.

FIG. 5 shows a simplified depiction of a reflector intended to produce the desired result. Axis A-A is centered on the illumination source and runs along the desired direction of beam projection. Axis V-V is a vertical axis, and axis H-H is a horizontal axis. Vertical plane reflector 34 is a parabolic reflector lying in the plane defined by the V-V and the A-A axes. By using a significant curvature, the vertical plane reflector creates a focused pattern in the vertical direction so that the projected light does not spread very far above or below horizontal.

Horizontal plane reflector 36 is a curved reflector lying in the plane defined by the A-A and H-H axes. By using much less curvature than vertical plane reflector 34, light is allowed to spread more broadly in the horizontal direction.

FIG. 6 shows an actual three-dimensional combined reflector 38 that combines the attributes of vertical reflector 34 and horizontal reflector 36 depicted in FIG. 5. Combined reflector 38 is essentially a series of parallel parabolic reflectors that are swept along a more gently curved horizontal path. End plates are placed on the two horizontal ends to limit further light spread.

FIG. 7 shows the high beam pattern of light projected by combined reflector 38 onto a vertical wall placed in front of the headlamp assembly. This type of pattern is familiar to those skilled in the art. The axes H'-H' and V'-V' are projected onto the wall by aiming the headlamp assembly and projecting the axes H-H and V-V forward along the axis A-A shown in FIG. 6.

In the beam projection shown in FIG. 7, brightest region 40 is centered just below the horizontal, but a portion extends above the horizontal. The projected beam spreads laterally a considerable distance. FIG. 8 shows the projection for the low beam. The reader will note that brightest region 40 is shifted downward. Cut-off line 42 is a sharp cut off. No significant light is projected above the axis H'-H' to the left of the axis V'-V'. Side lobe 44 is projected above the horizontal to the right of the vertical axis V'-V'. This is conventional for nations driving on the right side of the road. No light is projected above axis H'-H' and to the left of axis V'-V' because this would dazzle drivers traveling in the opposite direction. The location of the side lobe is dictated by leaving a small portion of shroud 30 (see FIG. 3) open. When viewing the shroud from the rear looking forward (in the direction the beam is projected) a gap on the lower left will produce a projected lobe on the upper right. For countries driving on the left side of the road, a gap is located on the lower right of the shroud and the projected lobe will appear on the upper left. The side lobe is useful for illuminating road side signage and the like.

Looking at FIG. 8, the location and attenuation rate of cut-off line 42 is important. A sharp cut-off line is desired in order to avoid dazzling oncoming drivers. In comparing the projection patterns of the high beam (FIG. 7) and the low beam (FIG. 8), the reader will appreciate the differing objectives for the two patterns.

The patterns shown are for a prior art halogen bulb. A common alternate source is a high intensity discharge bulb ("HID"). The illumination source for a HID bulb comes from an electric arc between tungsten electrodes. The electrodes are housed within a tube filled with a noble gas and suitable metals or metal salts. HID bulbs tend to be brighter than halogen bulbs for a given electrical power consumption. HID bulbs are also more nearly a point source when compared to halogen bulbs. However, the same reflector geometry can be used effectively for halogen or HID bulbs.

FIGS. 9 and 10 depict a more recent system known as a projector system. FIG. 9 shows the projector system in a high beam configuration. Illumination source 14 is again placed proximate the focus of reflector 16. Reflector 16 is given a more pronounced curvature in order to concentrate the reflected light beams at focus 48. These beams then diverge again proceeding forward from focus 48. The beams are next passed through convex lens 46, which focuses the beams and projects them down the road in a tighter pattern.

FIG. 10 shows the same configuration with a low beam filament illuminated. Shroud 30 is again positioned to occlude part of the beam so that most of the projected light falls on or below the axis A-A. A projector system such as shown in FIGS. 9 and 10 can provide a better focused high beam that projects further down the road, in comparison to reflector systems. However, it is sometimes difficult to design a projector system which works well in a dual beam configuration while maintaining a reasonable depth for the overall headlamp assembly. Thus, projector systems are often used in combination with reflector systems. In one such a scenario the high beam is a projector system having a single light-producing element and the low beam is a separate reflector system having a single light-producing element. In other scenarios the projector system is used for the low beam and the reflector system is used for the high beam. Such hybrid systems are often contained in a unified headlamp housing. The low beam reflector units in such a system may also serve as daytime running lights.

In recent years light emitting diodes ("LED's") have become a useful illumination source. Many LED's can now be located in a small area using chip-on-board arrays. Such an array can now produce a luminous intensity that greatly exceeds a halogen filament of comparable size. Such an array is also more efficient in terms of converting electrical power to luminous intensity. Numerous manufacturers have developed LED-based illumination sources that are configured to directly replace a halogen or HID headlamp bulb.

FIG. 11 shows an exemplary LED illumination source 48 that is configured for use in a vehicle headlamp assembly. Base 24 includes the same mounting features as the base found on the prior art halogen bulb of FIG. 3. The mounting features must be the same - as these engage corresponding features on the headlamp assembly in order to retain the bulb in the proper position and provide suitable electrical contacts. Frame 52 extends forward from base 24 along the axis A-A. The frame occupies roughly the same position as enclosure 17 in the halogen illumination source 14. The source 48 is shown in the installed orientation - as it will actually be used within a headlamp assembly.

A cutaway 55 is provided on each lateral side of frame 52 (Only one side is visible in FIG. 11 but the other cutaway is a mirror of the one shown). In the example shown 3 LED chips 54 are located in the middle of the cutaway. When energized, these chips 54 radiate light laterally outward from frame 52. A corresponding set of chips 54 is located on the opposite side of frame 52 and radiate light in the opposite direction. Such chip-on-board arrays radiate light in a widely dispersed pattern. The luminous intensity is greatest along a vector that is normal to the flat surface of the array. However, the luminous intensity is still often 50% of the maximum when 60 degrees off the normal vector.

LED illumination source 48 is designed to plug directly into a headlamp assembly designed for a prior art halogen bulb. Thus, LED chips 54 (3 per side) are placed as close as possible to the position of the incandescent filament in the prior art halogen bulb. The position is inherently only an approximation, as the LED chips must be offset somewhat from the central vertical plane of frame 52 in order to provide space for physical mounting and electrical current supply. The reader will also note that - while the halogen filament projects light in all directions - the LED chip arrays tend to project light laterally and do not project much light up or down. This is not a major concern, as the reflectors (such as seen in FIG. 6) make better use of the lateral light than the vertical light. In addition, because the LED can be made so much brighter, the loss of some of the available reflector area is more than offset by the increased luminous intensity of the illumination source. Thus, an LED illumination source 48 such as shown in FIG. 11 works well as a "plug-in" replacement in an existing lamp assembly designed for a halogen or HID bulb.

Of course, LED arrays cannot be simply driven with 12 V or 24 V vehicle power. In the example of FIG. 11, suitable driver electronics are contained within housing 50. A cooling fan or substantial heat sink is also often included. The LED chips themselves generate considerable heat. A conductive metal — such as aluminum or zinc — is typically used for frame 52. The frame conducts heat away from the vicinity of the chips. A cooling fan is often provided to force more air circulation over the LED chips and the driver circuitry. The cooling fan in this example is contained within housing 50.

Some prior art manufacturers are also offering LED-based dual-beam units. FIG. 12 shows a prior art dual-beam LED illumination source 49. The two lateral cutaways in frame 52 are elongated in order to accommodate a high bream LED array 56 and a low beam LED array 58. A shroud 61 is incorporated in the shape of the cutaway in this example. Low beam LED array 58 is placed as close as possible to the position of the low beam filament in the bulb the LED illumination source is intended to replace. The shroud portion of the cutaway restricts downward illumination from the low beam LED array and fulfills the purpose of the shroud 30 shown in the halogen example of FIG. 3.

Those skilled in the art will know that the light produced by headlamp assemblies is subject to governmental regulations. In the United States the relevant regulations are primarily set forth in the Federal Motor Vehicle Safety Standards. These are contained in Chapter 49 of the Code of Federal Regulations, section 571 (and particularly incorporated standards in 571.5 and specified standards in 571.108). In the European Union, headlamp specifications are set forth in Regulation No. 48 of the Economic Commission for Europe of the United Nations (UNECE). Though U.S. and European regulations differ, both set standards for luminous intensity ("brightness") at various ranges and angles from the centerline of a headlamp assembly. A headlamp assembly that complies with the applicable set of regulations is said to be "conforming." The reader should note that whether a headlamp assembly is a conforming assembly will often depend on the jurisdiction in which it is operated.

Headlamps incorporating LED illumination sources (or other illumination sources) have the ability to significantly exceed the brightness standards set by the regulatory authorities for on-road use. Headlamps incorporating such innovative illumination sources also have the ability to exceed the angular dispersion standards (such as by dispersing the projected light too widely). Such headlamps are not suitable for on-road use. Such headlamp assemblies are said to be "non-conforming."

While not suitable for on-road use, non-conforming headlamp assemblies are quite useful for off-road trail expeditions and the illumination of off-road worksites - among many other uses. In the prior art, a user has to physically change the illumination source in order to convert from a source producing a non-conforming headlamp beam to a source producing a conforming beam. This means accessing the headlamp assembly and physically removing one bulb and replacing it with another. With the tight component packaging seen in modern vehicles, changing a bulb can be quire cumbersome. The present invention provides an illumination source that can be easily switched between a conforming ("on-road") projected beam and a non-conforming ("Off-road") projected beam without having to change a bulb.

BRIEF SUMMARY OF THE PRESENT INVENTION

The present invention comprises a headlamp illumination source that switches from a first configuration conforming to on-road illumination standards to a second configuration that does not conform to on-road illumination standards. The switching is preferably controlled by a wireless signal but in some embodiments the switching can be controlled by a hard-wired signal or by a switch proximate the illumination source itself.

Figure 1:
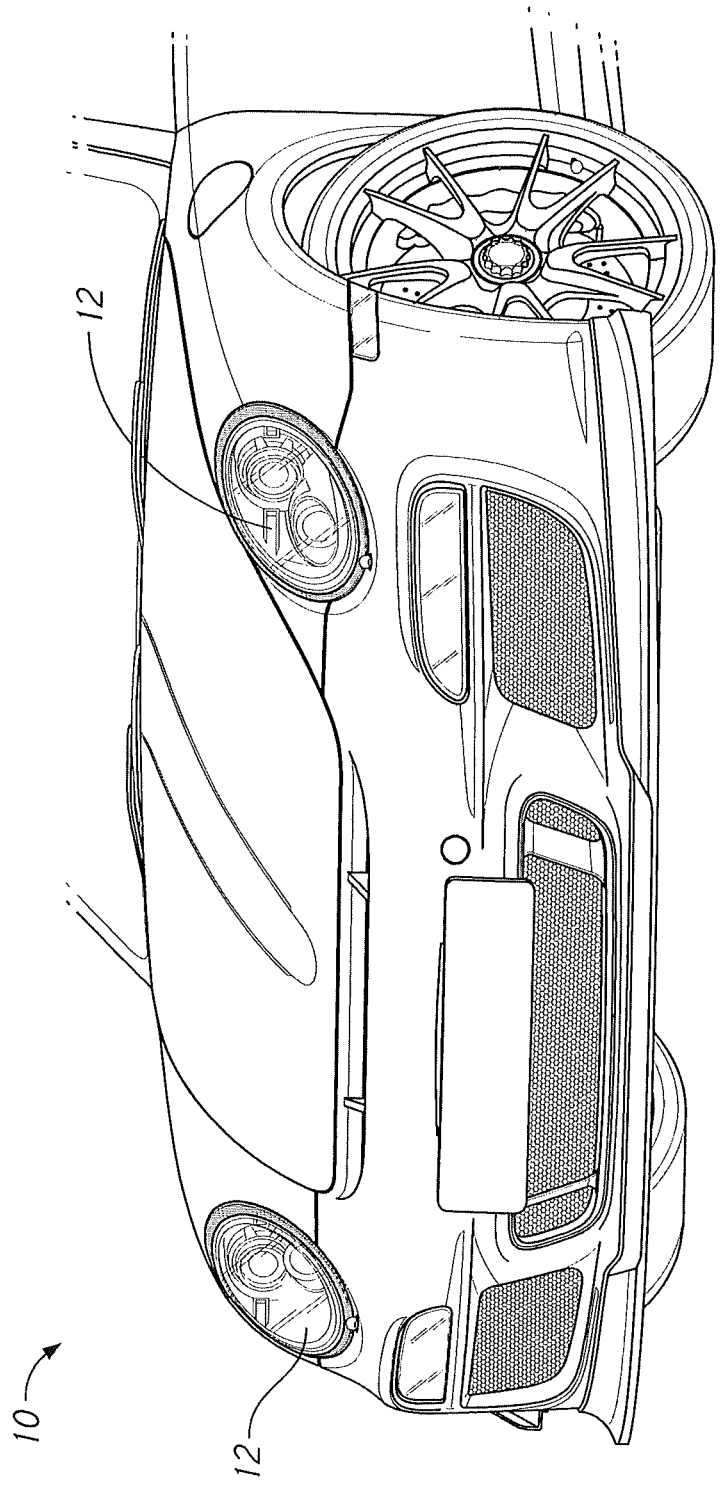
FIG. 1 is a perspective view, showing a left and right headlamp assembly on a prior art vehicle.
Figure 2:
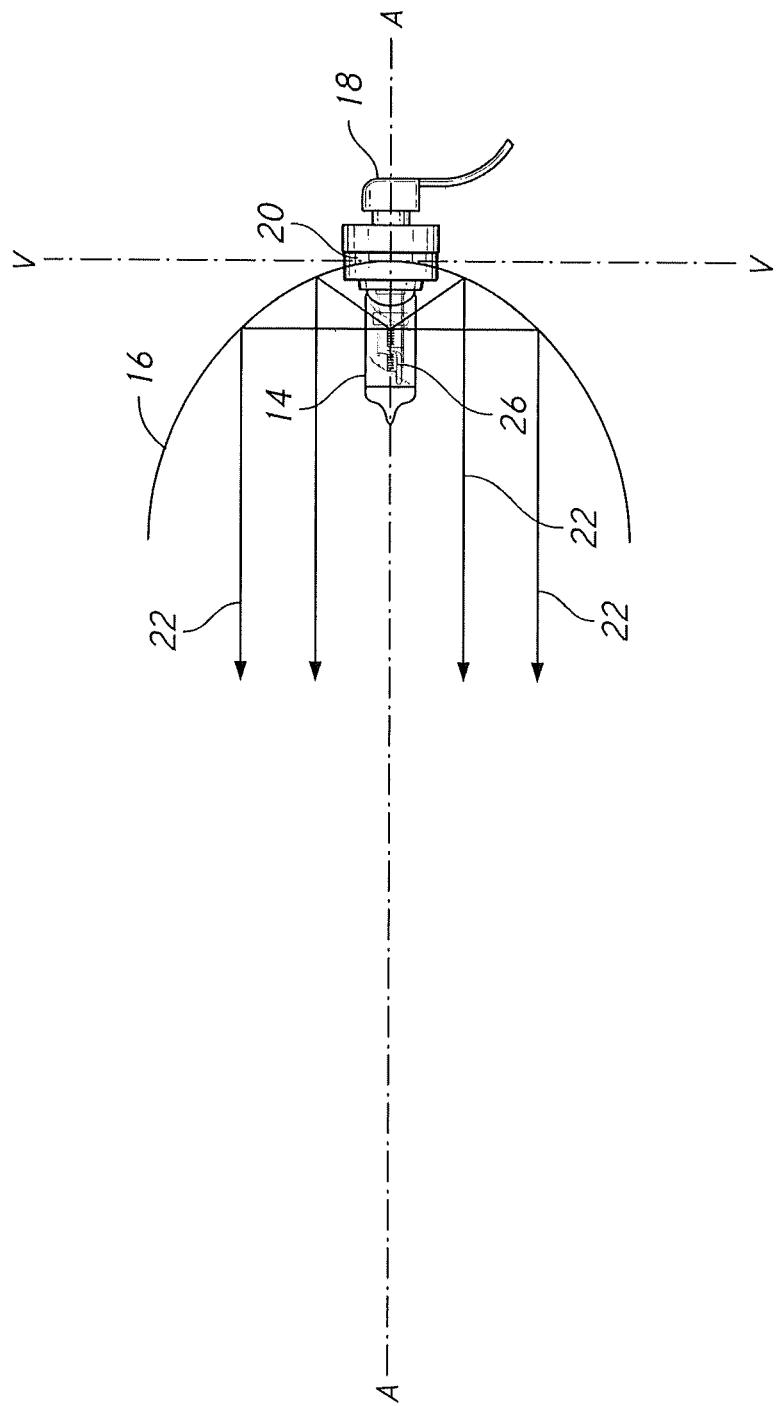
FIG. 2 is a sectional elevation view, showing a prior art halogen illumination source and its associated reflector.
Figure 3:
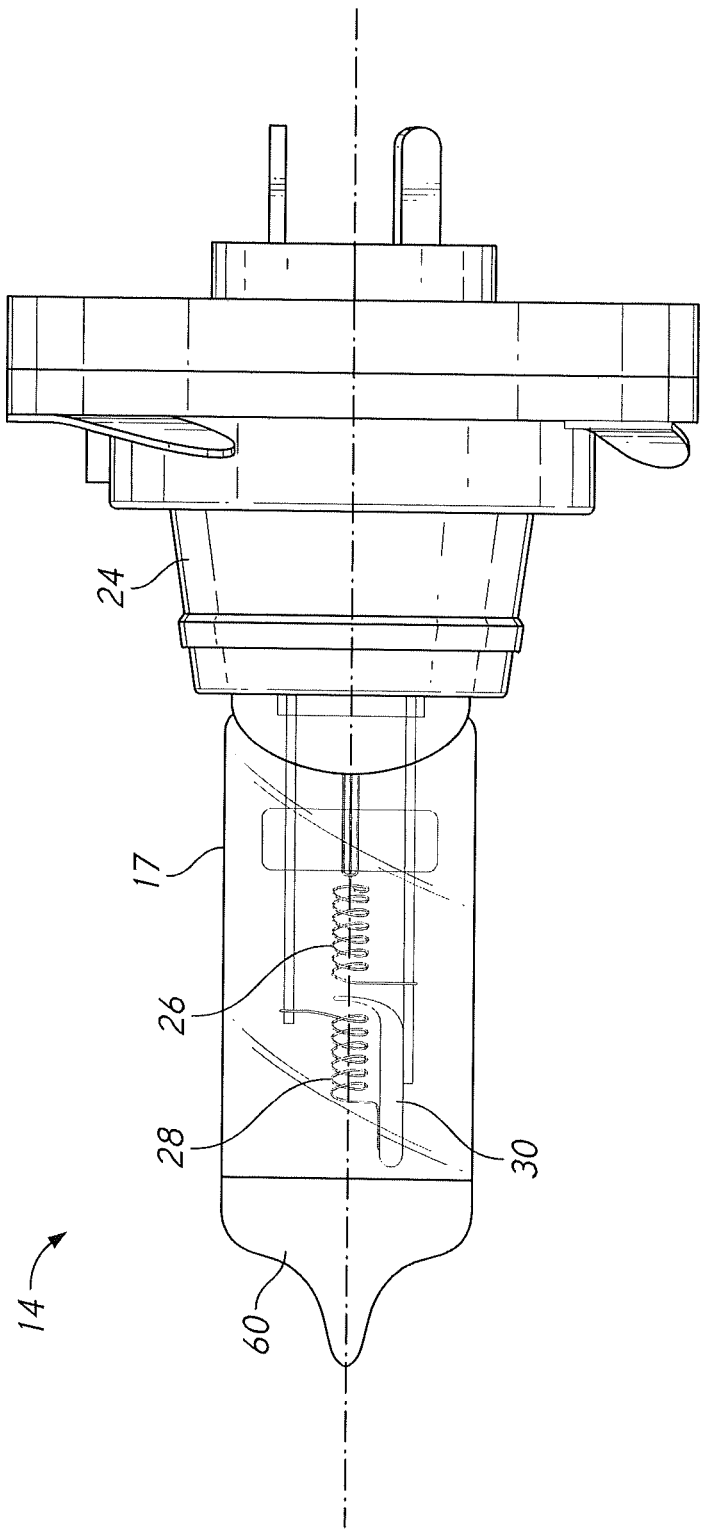
FIG. 3 is an elevation view, showing a prior art halogen illumination source.
Figure 4:
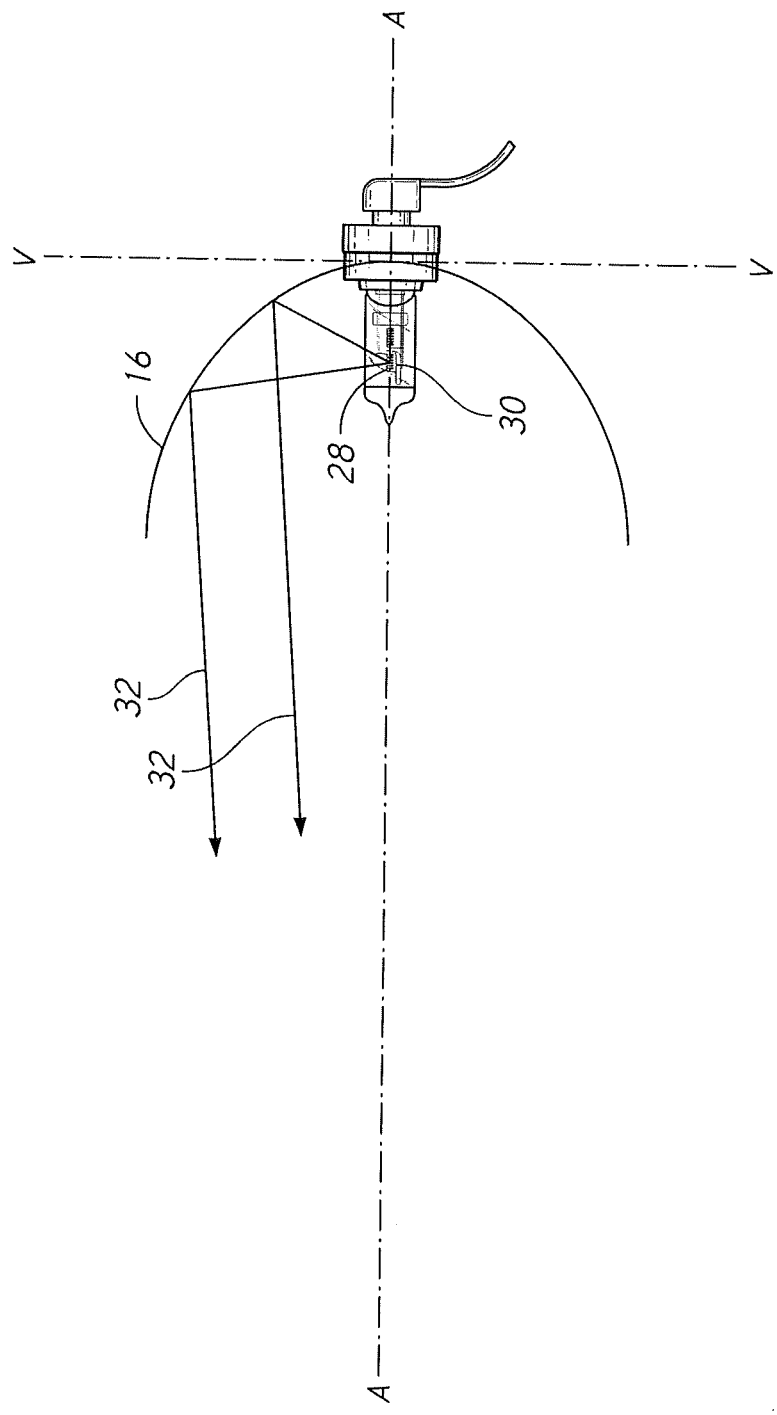
FIG. 4 is a sectional elevation view, showing the position of a high beam filament and a low beam filament in a prior art halogen illumination source.
Figure 5:
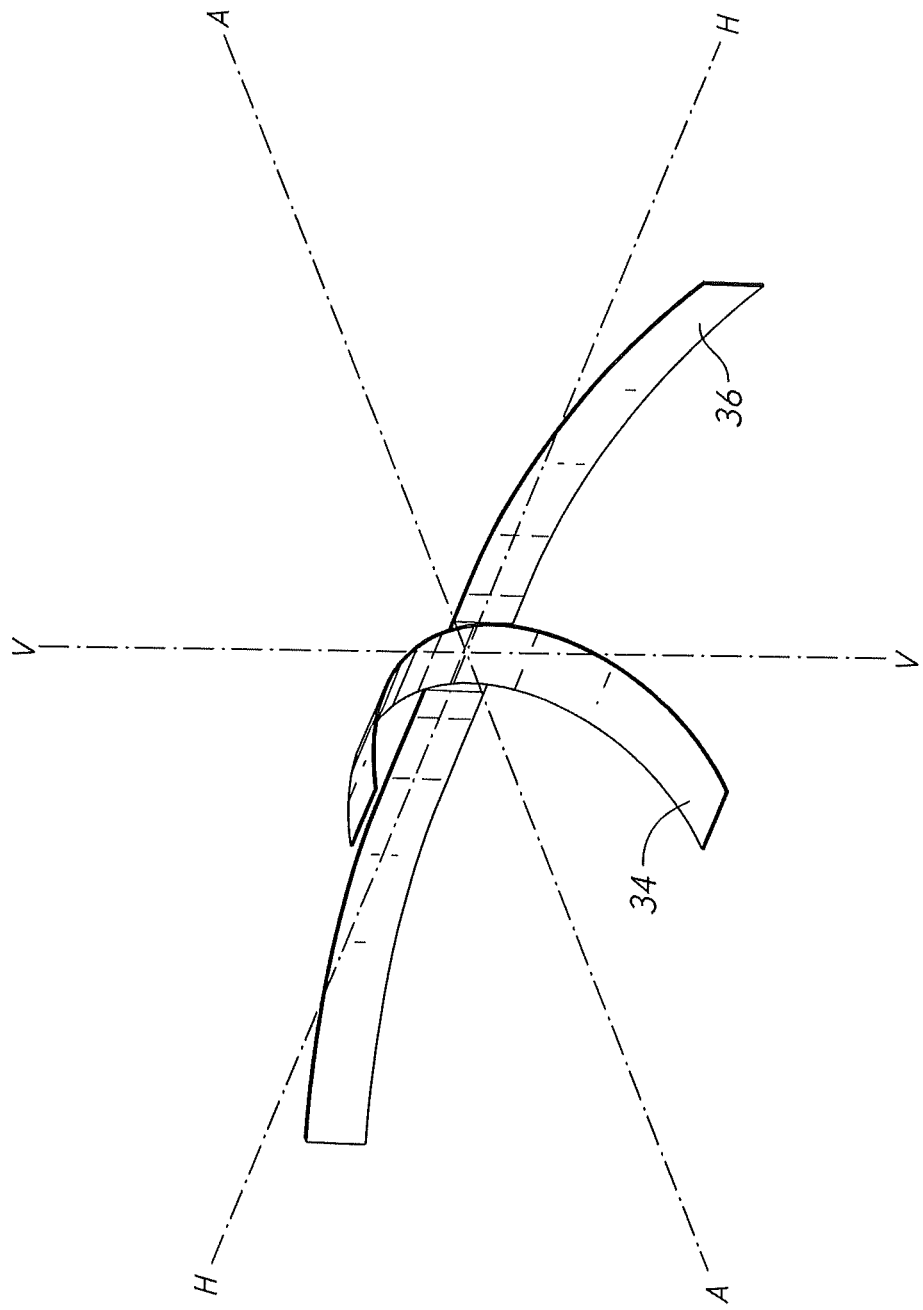
FIG. 5 is a perspective view, showing the nature of a focusing reflector in the horizontal and vertical axes.
Figure 6:
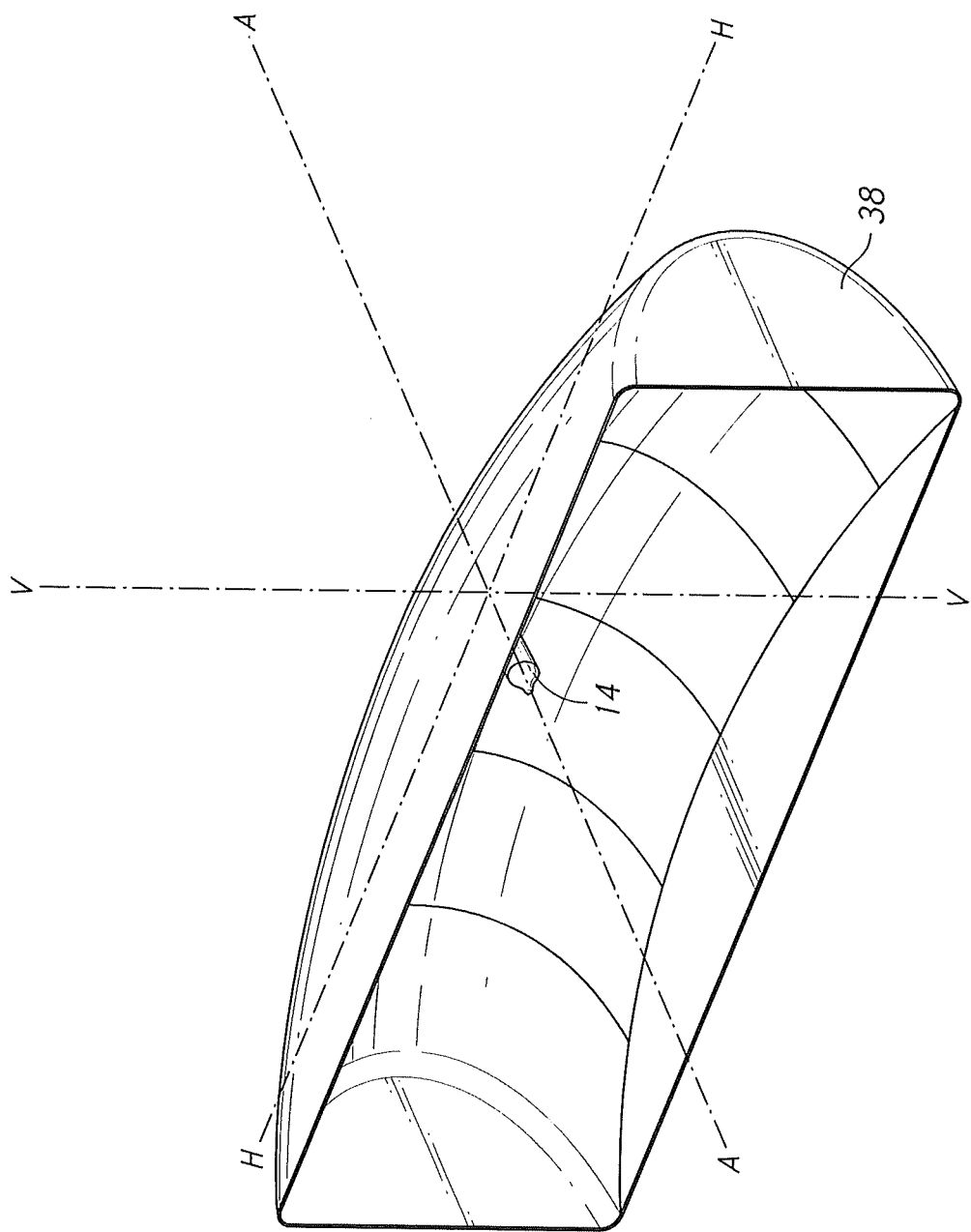
FIG. 6 is a perspective view, showing a prior art focusing reflector.
Figure 7:
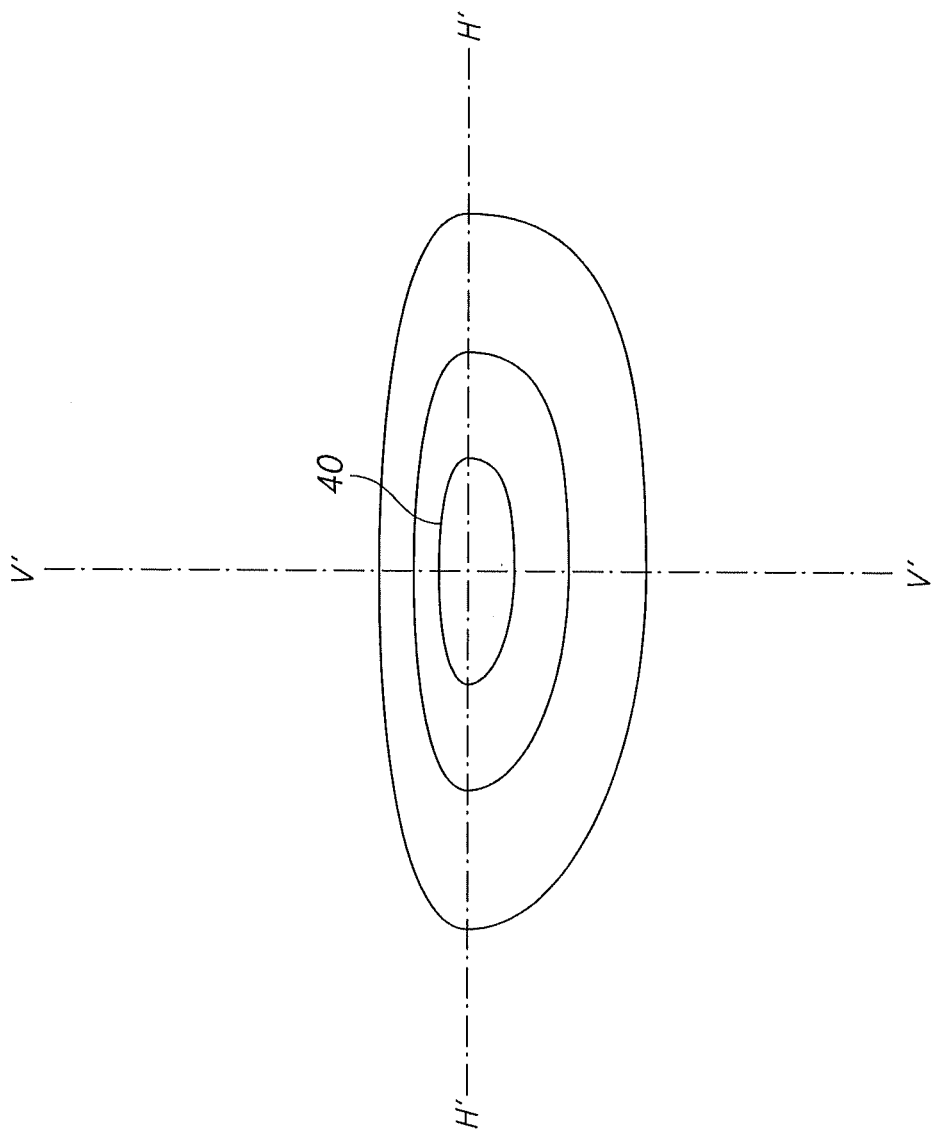
FIG. 7 is an elevation view, showing a prior art high beam illumination pattern.
Figure 8:
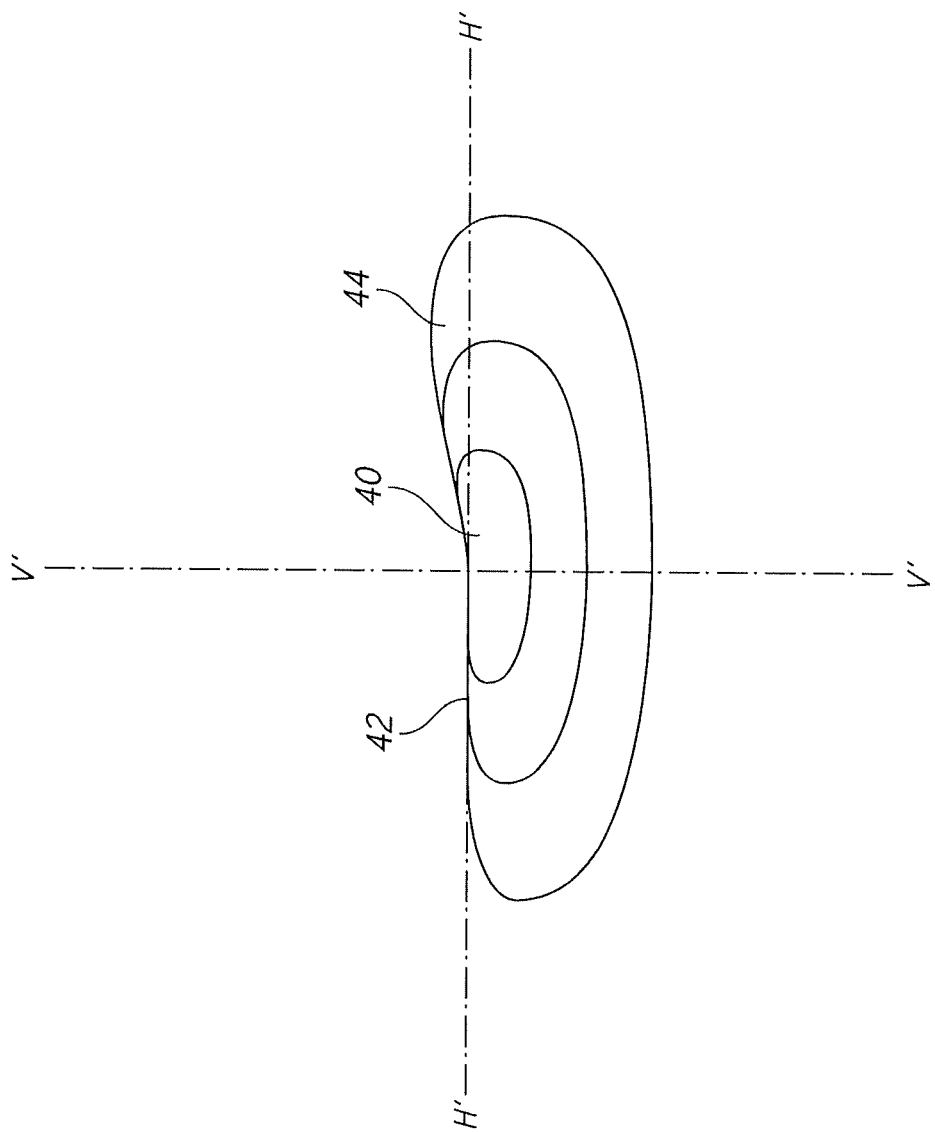
FIG. 8 is an elevation view, showing a prior art low beam illumination pattern.
Figure 9:
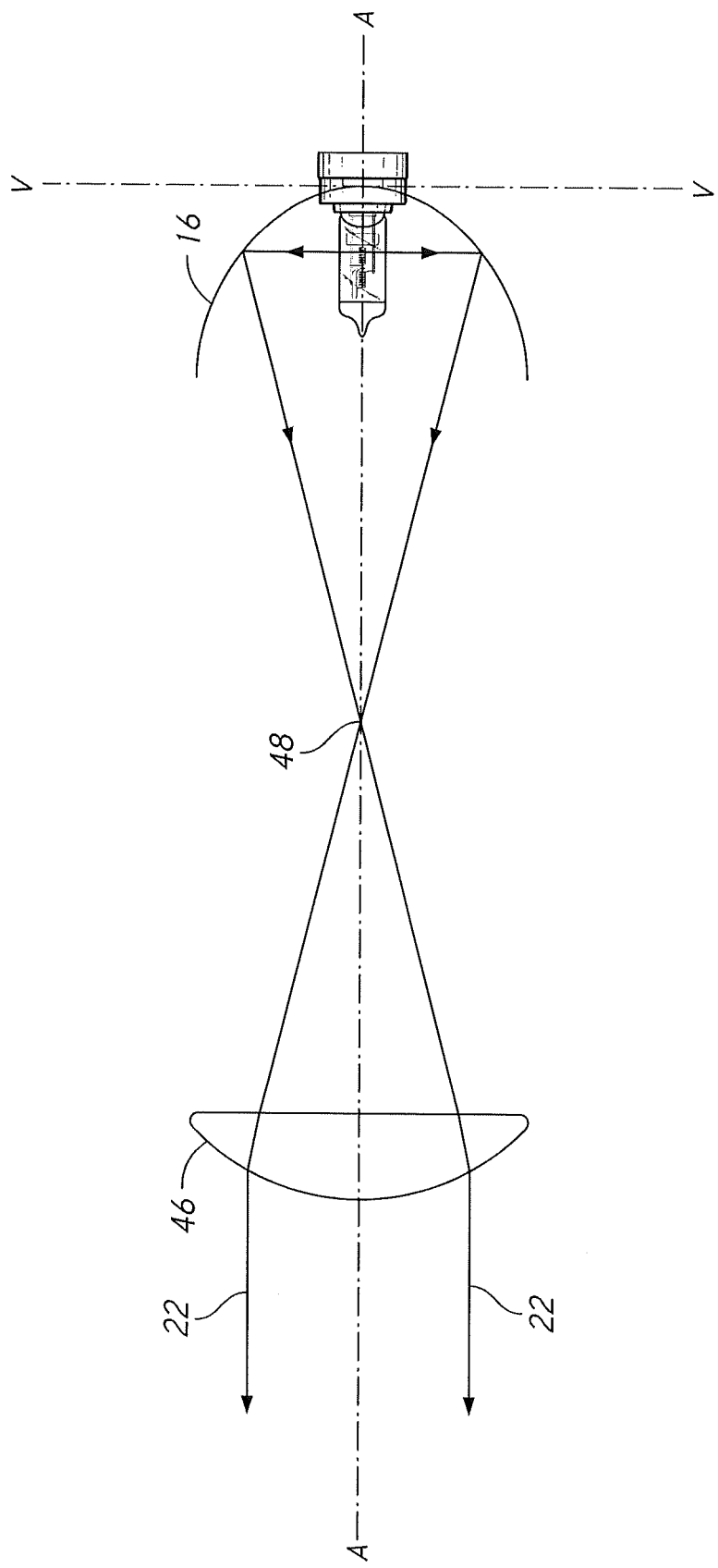
FIG. 9 is a sectional elevation view, showing a prior art projector headlamp system (high beam).
Figure 10:
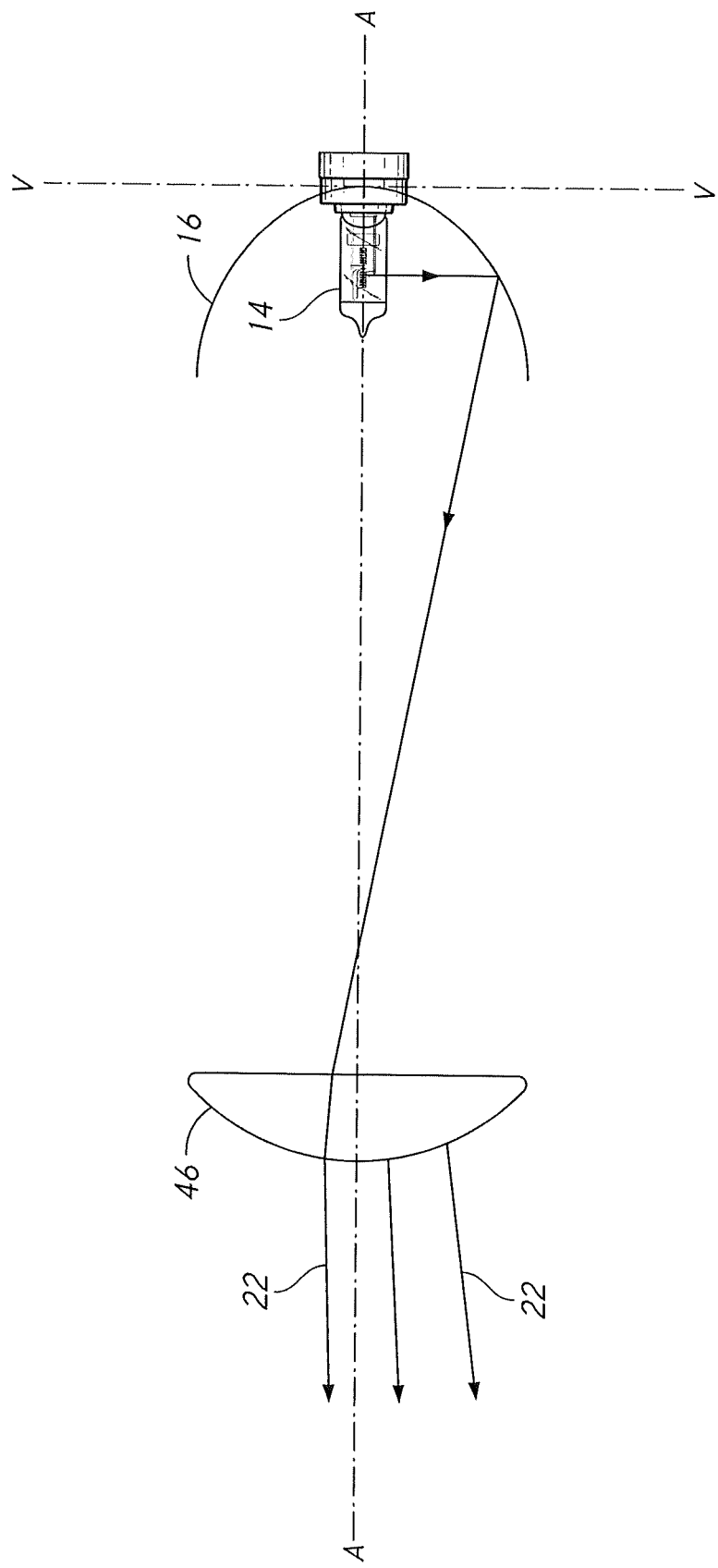
FIG. 10 is a sectional elevation view, showing a prior art projector headlamp system (low beam).

REFERENCE NUMERALS IN THE DRAWINGS 10 vehicle
12 headlamp assembly
14 illumination source
16 reflector
17 enclosure
18 OEM wiring harness
20 mount
22 ray
24 base
26 high beam filament
28 low beam filament
30 shroud
32 ray
34 vertical reflector
36 horizontal reflector
38 combined reflector
40 brightest region
42 cut-off line
44 side lobe
46 lens
48 focus
50 housing
52 frame
54 LED chip
55 cutaway
56 high beam array
58 low beam array
60 end occlude
61 shroud
62 illumination source
64 connector
66 antenna
68 digital input
70 analog input
71 analog input
72 power supply
74 communication module
76 controller
78 memory
81 current control device
82 current control device
84 current control device
86 current control device
88 current control device
90 current control device
92 current control device
94 resistor
95 current control device
96 current control device
98 beam sense line
100 OEM harness connector
102 housing
104 fan
106 selector knob
108 indicator
110 pointer
111 antenna
112 smartphone
114 touchscreen display
116 graphical user interface
118 OBD module
120 antenna
122 OBD plug
124 rotary switch
126 LED chip
128 LED chip
130 shank region
132 LED chip
134 LED chip
136 LED
138 LED
140 LED
142 LED
144 LED
146 LED
148 temperature sensor

DETAILED DESCRIPTION OF THE INVENTION

The following detailed descriptions pertain to specific embodiments of the invention. The embodiments disclosed can be combined and modified in additional ways while still falling within the present invention. Those skilled in the art, upon reviewing this disclosure, will also readily discern still more embodiments falling within the present invention. The scope of the invention should thus be determined by the claims presented rather than the descriptions of any specific embodiment.

Figure 11:
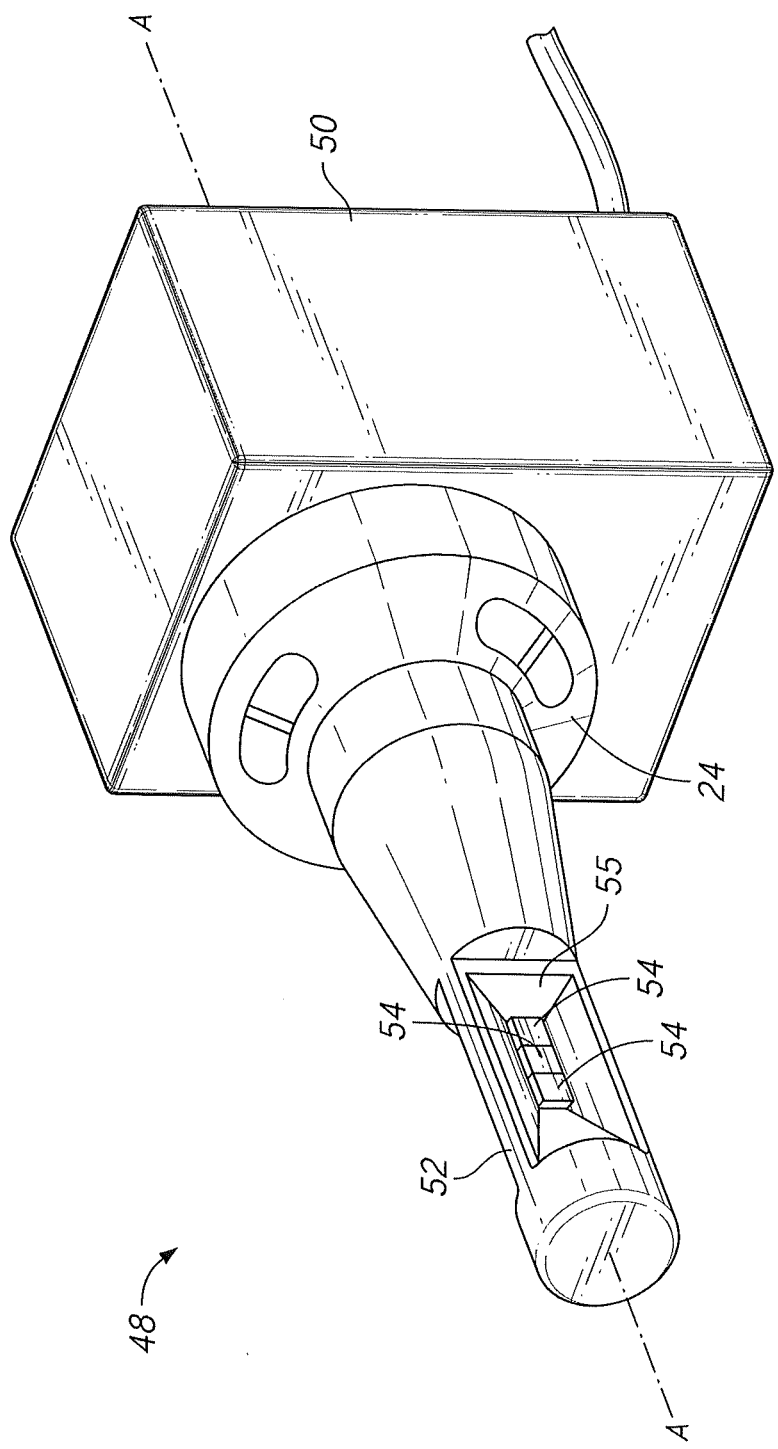
FIG. 11 is a perspective view, showing a prior art LED-based headlamp illumination source.
Figure 12:
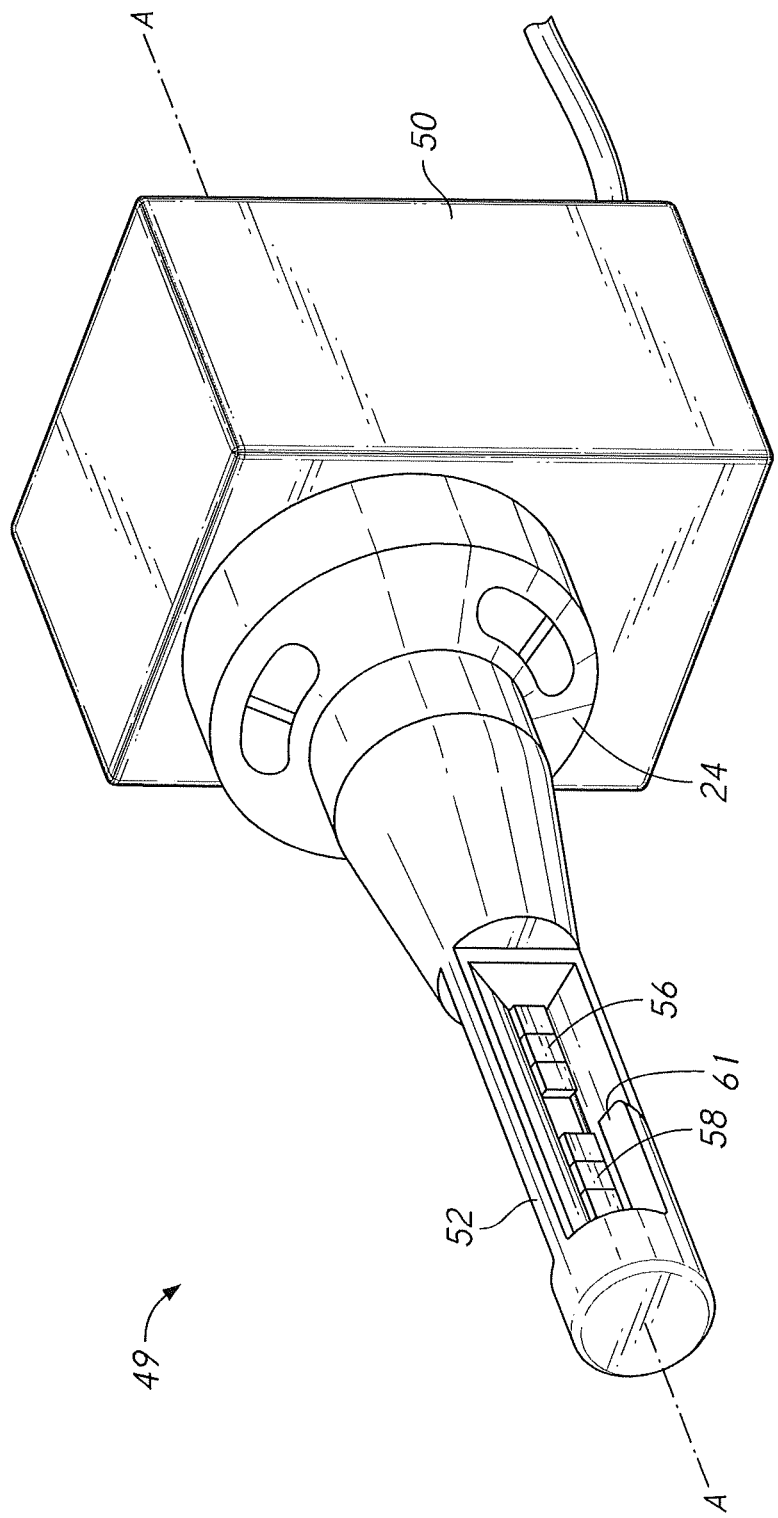
FIG. 12 is a perspective view, showing a prior art LED-based dual-beam headlamp illumination source.
Figure 13:
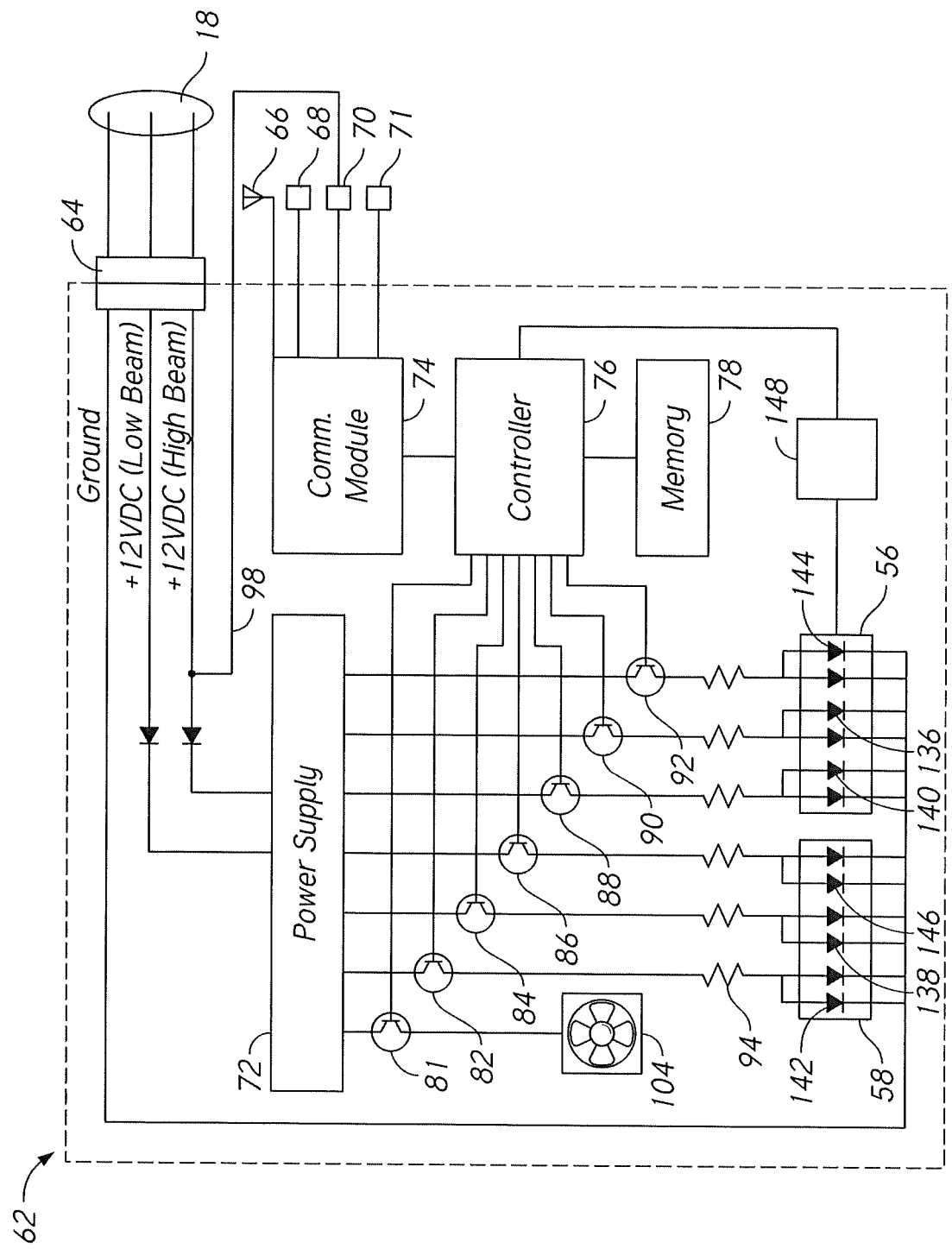
FIG. 13 is a schematic view, showing a first embodiment of the present invention.
Figure 14:
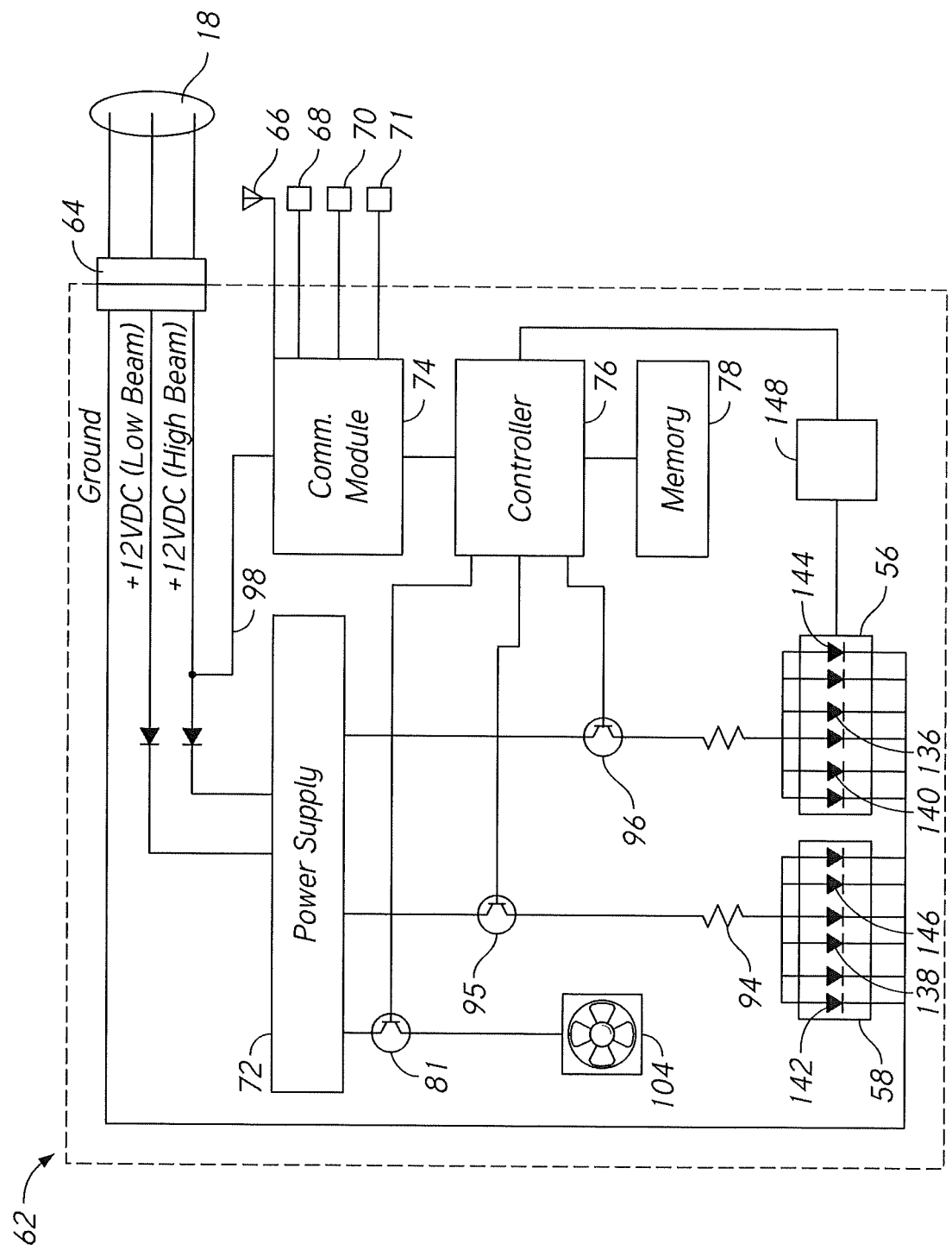
FIG. 14 is a schematic view, showing a second embodiment of the present invention.
Figure 15:
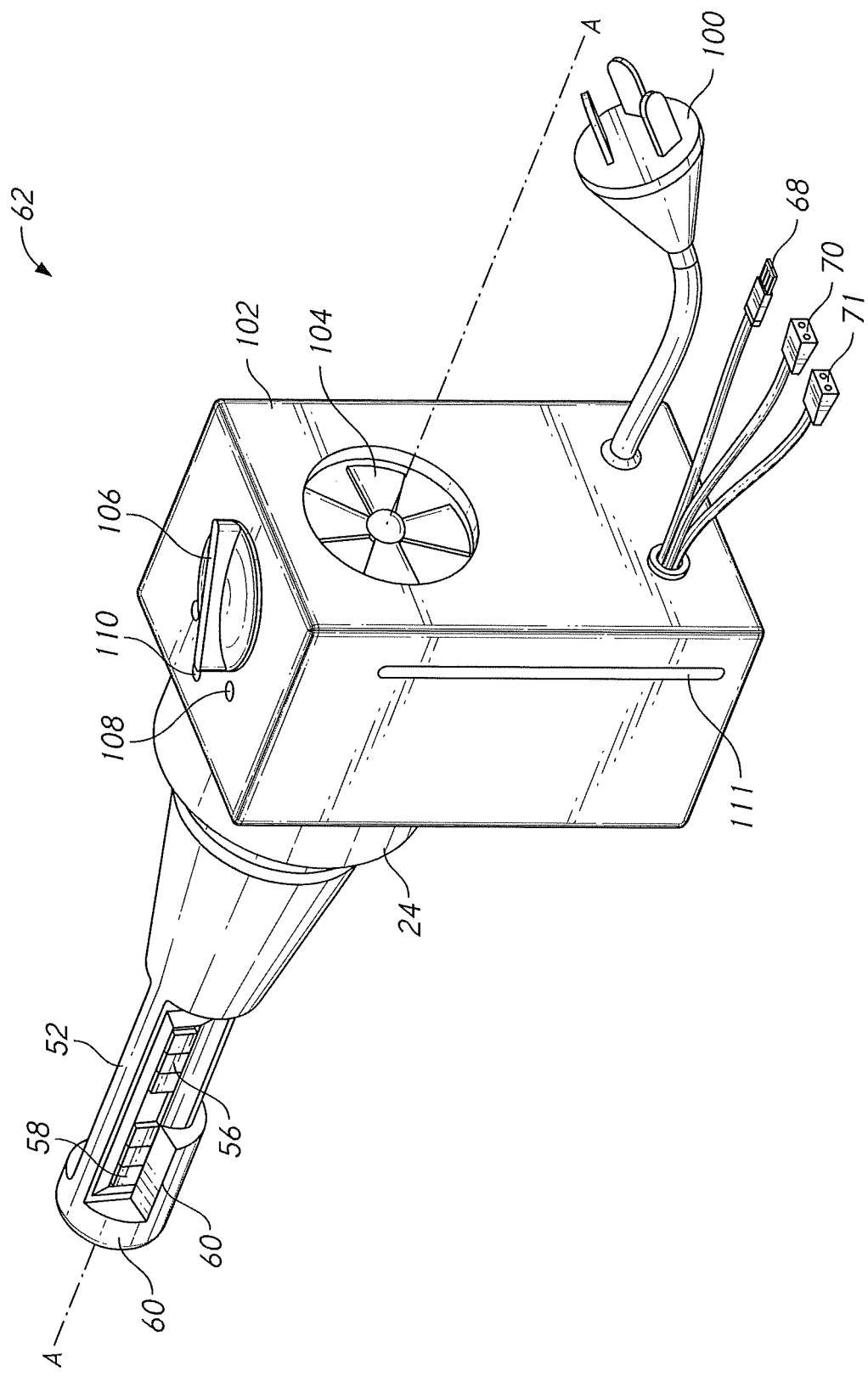
FIG. 15 is a perspective view, showing physical features of the present invention.

The present invention can encompass a variety of illumination sources in a headlamp assembly, such as the LED illumination sources shown in FIGS. 11 and 12. FIG. 15 provides a perspective view of an embodiment of the invention - designated as illumination source 62. FIGS. 13 and 14 provide schematic views to explain the internal electrical operations of this embodiment.

In the example of FIG. 13, illumination source 62 includes a high beam LED array 56 and a low beam LED array 58. Each array is shown as containing six LEDs (represented as simple diodes in the view). The inventive device uses a physical construction such as shown in FIG. 15. High beam array 56 includes three chip LEDs facing toward the viewer and three chip LEDs facing away from the viewer on the opposite side of frame 52 (These three chip LEDs on the opposite side are not visible in the view but they are a mirror image of the chip LEDs that are visible). Low beam array 58 likewise contains three chip LEDs facing toward the user and three chip LEDs facing away from the user.

Those skilled in the art will know that each chip LED usually contains multiple individual LEDs (such as combinations of red, blue, and green LEDs to produce a blended white light). Such a chip LED is simply referred to as an "LED" in this disclosure and represented by a single diode symbol in the schematics provided. The use of the singular term or the singular symbol should not be viewed as limiting.

Returning to FIG. 13, OEM harness 18 supplies DC vehicle power through connector 64. Connector 64 is preferably the same type of connector used for a prior art headlamp bulb. This allows the invention to simply be plugged into the existing vehicle wiring harness. The vehicle harness provides a connection to ground as well. The vehicle harness selects high beams or low beams by selectively energizing the low beam power line or the high beam power line. For most vehicles the voltage will be approximately 12 VDC but for commercial vehicles this will more commonly be + 24 VDC. The invention can be configured for both these voltages and other voltages as well. The OEM harness provides one of three states. These are (1) both power lines off, (2) high beam power line on and low beam power line off, and (3) high beam power line off and low beam power line on.

The example of FIG. 13 draws power from the OEM harness. Thus, if the vehicle's headlamps are switched off, no power is provided to the invention (Memory functions within the invention can be retained with a small on-board battery as commonly used in the art). However, if either the high beam or low beam power lines are energized, then power is provided to power supply 72. Power supply 72 contains suitable driver circuitry for driving the LED arrays and for powering digital devices such as communication module 74, controller 76, and the associated memory 78. Power supply circuitry suitable for this application is well known to those skilled in the art and so it will not be described further.

The inventive illumination source 62, however, contains additional features which are not common to prior art LED driver circuitry. The reader will note that the LEDs are arranged in pairs. Each pair of LEDs contains a first LED on a first side of frame 52 (see FIG. 12) and a second LED on a second side of frame 52 (the opposite lateral side). In this example, each pair of LEDs is switched together since there is little demand for the creation of an asymmetric pattern of light.

In the schematic of FIG. 13, a current control device 82-92 is provided on the line powering each pair of LEDs. The current control device is depicted as a transistor. These can provide simple "on/off" switching. A more sophisticated type of transistor can also be used to provide different levels of current through the device in order to vary the brightness of each LED pair as desired. In this example, a current control resistor 94 is provided on each controlled line in order to protect the LEDs from an over-current spike.

As those skilled in the art will know, an LED behaves as a Schokley diode, meaning that the current rises exponentially with the applied voltage. A small change in voltage can cause a large change in current and a large change in heat production. Current through an LED is generally regulated with a current limiting resistor (such as resistors 94) and a constant current power source. Thus, while current control devices 82-92 are depicted as simple transistors, in many embodiments they will be more sophisticated devices configured to set and maintain a desired current (and therefore a desired brightness for the LED they feed).

In these examples controller 76 regulates the operation of the current control devices with a low-current control line (connected to the base of a simple transistor, for instance). The control line can often be a logic-level line that can be controlled directly from an I/O port on a processor acting as controller 76.

An important operative concept in the present invention is the provision of a convenient method for a user to alter the brightness — and perhaps other characteristics — of the illumination source. Controller 76 facilitates these features. In the schematic of FIG. 13, controller 76 independently controls each of the current control devices 82-92.

The controller itself can assume many forms. In a simple embodiment it can be a switch array that responds to input signals by switching on or off the current control devices. A set of logic gates can perform this function, and such a set of logic gates can be built into an application specific integrated circuit or assembled separately on a printed circuit board.

In a more complex embodiment, a processor can be used in the controller. The processor can include on-board memory and — in some embodiments requiring more memory — a separate associated memory 78 can be used. Software carrying out the desired functions can be loaded in memory 78 and retrieved and run as needed by the processor. In some embodiments the software can be updated or altered from an external source.

Communications module 74 provides communication between external components and processor 76. This allows the receipt of external commands directing a change in the state of the LED arrays. In some embodiments the communications module will be incorporated into the controller. In the version shown, it is a separate module in communication with the controller.

Several inputs are provided for the communications module. Antenna 66 facilitates wireless communications, which can be one-way-in or preferably two-way. Digital input 68 allows logic-level communications. As an example, digital input 68 can be attached to a vehicle Controller Area Network ("CAN") bus or Engine Control Unit ("ECU") bus. The existing vehicle bus can then be used for messages concerning controller 76.

Analog inputs 70,71 allow communications using simple switching controls - such as selectively applying available vehicle voltage (typically 12 VDC or 24 VDC). These are useful when an installer wants to mount a dedicated switch. As an example, a dash mounted switch can be used to apply 12 VDC to an analog input in order to change the status of the LEDs being controlled.

The version of FIG. 13 is a dual beam illumination source. Thus, it must account for a vehicle's normal switching between a high beam and low beam setting. One way to effectuate the normal high beam/low beam switching is to connect one of the analog inputs 70,71 to one of the power lines from the OEM harness. In the example of FIG. 13, beam sense line 98 is connected between the high beam power line and analog input 70. Voltage will be sensed on line 98 when the OEM vehicle harness powers the high beam circuit. This voltage is used to "tell" the controller to place the LEDs under control in a high beam configuration. On the other hand, if no voltage is sensed on line 98 this "tells" the controller to place the LEDs under control in a low beam configuration.

Figure 16:
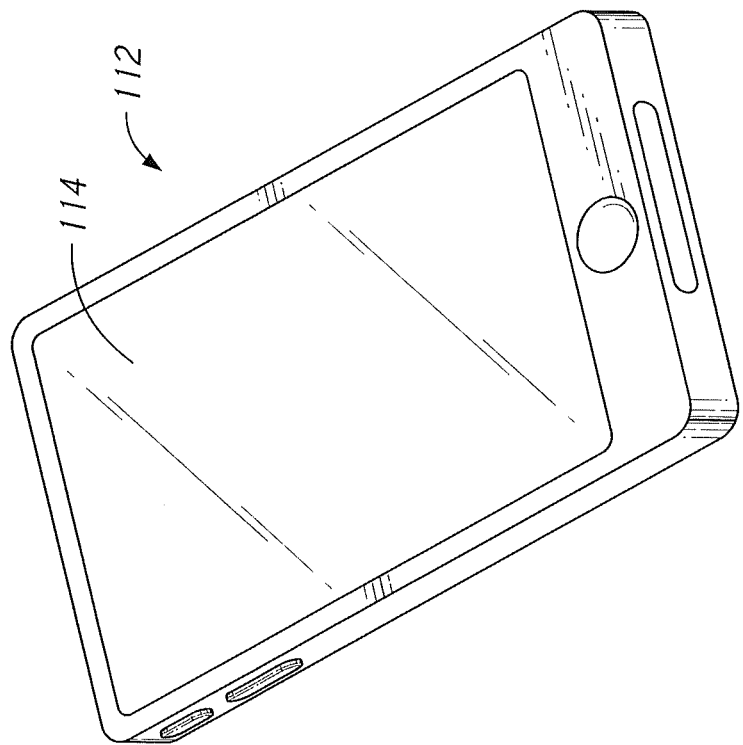
FIG. 16 is a perspective view, showing a prior art smartphone.

The inventive illumination device 62 is capable of far more than just carrying out conventional high beam/ low beam operations, however. Antenna 66 on communications module 74 allows it to receive wireless commands from a separate command device. FIG. 16 depicts an example of such a command device. Smartphone 112 is a portable computing device familiar to those skilled in the art. It contains a powerful processor and substantial memory. The memory contains various software applications that can be loaded into the processor and run. Further, the smartphone supports various wireless communication protocols. These include wireless local area network protocols, commonly known as "WiFi." It also supports proprietary short range communication protocols such as the BLUETOOTH protocol managed by the Bluetooth Special Interest Group of Kirkland, Washington, U.S.A.

Figure 17:
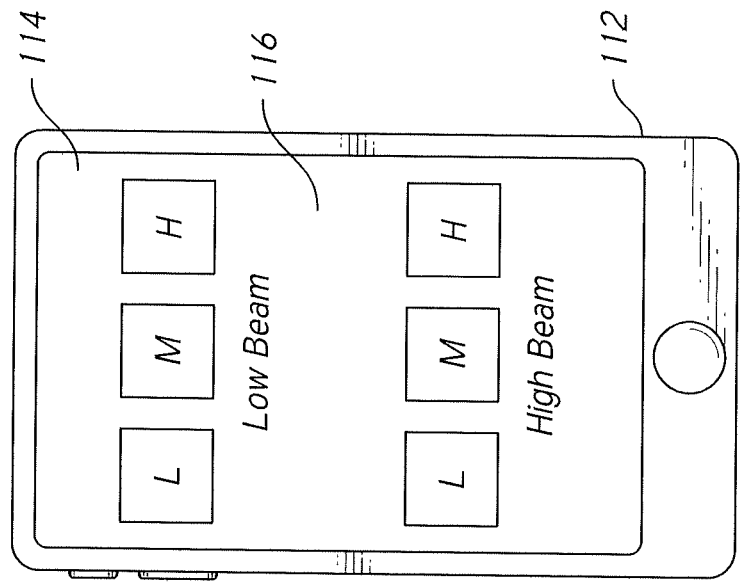
FIG. 17 is an elevation view, showing a graphical user interface according to the present invention presented on a smart phone.
Figure 18:
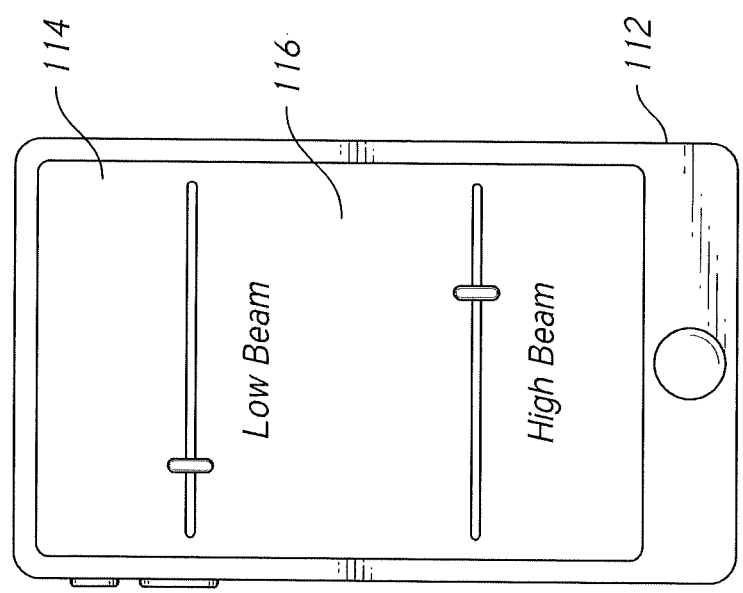
FIG. 18 is an elevation view, showing a graphical user interface according to the present invention presented on a smart phone.

As depicted in FIG. 16, smartphone 112 includes a touchscreen display 114. This display is used to provide a graphical user interface (GUI) that allows a user to interact with a software application running on the smartphone. Some embodiments of the present invention use such a GUI. As those skilled in the art will know, a GUI providing a given set of functions can be made to appear many different ways. FIGS. 17 and 18 provide two examples of a GUI that can be used with the invention.

In the example of FIG. 17, separate brightness settings are provided for the low beam and the high beam. The user can select low, medium, or high for the low beam and the high beam individually. Once the user finalizes the selections, smartphone 112 wirelessly transmits the commands to communication module 74 in the inventive illumination source 62. As an example, the BLUETOOTH communication protocol can be used to pair smartphone 112 with the inventive illumination source 62. The commands sent by the smartphone are received at communication module 74 within illumination source 62.

As an example, the commands sent by the smartphone can be for a "low" setting for both the low beam and the high beam. In this example, the "low" setting produces a projected beam (from the headlamp assembly in which the illumination source is mounted) that is conforming -meaning that the projected beam conforms to the applicable vehicle illumination standards for the area where the vehicle is being used.

Returning now to FIG. 13, the commands from the smartphone are received by communication module 74 and sent to controller 76. The currently selected status (low for both high beam and low beam) is stored in memory 78. Controller 76 also monitors for the status of the OEM harness conductors to determine whether the driver has selected off, low beam, or high beam. In this example, controller 76 switches off current control devices 82, 86, 88, and 92. The LEDs attached to those current control devices therefore become inactive. If the driver turns on the headlamps with the high beam selected, voltage will be provided to power supply 72 and voltage will be sensed on beam sense line 98 (which is fed into communication module 74 by analog input 70). Controller 76 responds by switching on current control device 90, thereby providing power to a pair of LEDs 136. If the driver turns on the headlamps with the low beam selected, voltage will again be provided to power supply 76 but no voltage will be sensed on line 98. Controller 76 responds by switching on current control device 84, thereby providing power to a pair of LEDs 138.

Figure 24:
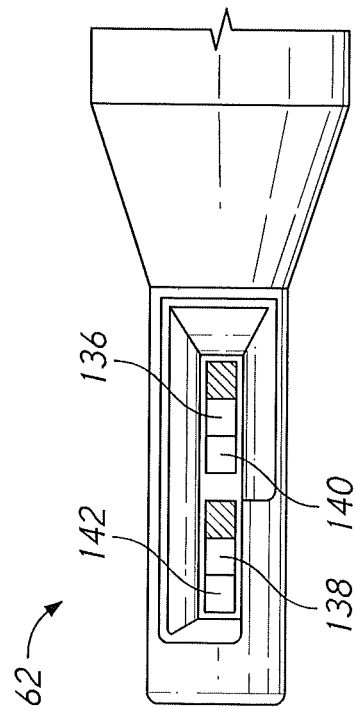
FIG. 24 is an elevation view, showing a low illumination state for an inventive illumination source.

FIG. 24 shows the result for inventive illumination source 62. For the high beam state, LED 136 (and its mirror LED on the far side of frame 52) is illuminated and all other LEDs are dark. For the low beam state LED 138 (and its mirror LED on the far side of frame 52) is illuminated and all other LEDs are dark. In FIG. 24 the high beam and low beam LEDs are shown illuminated at the same time. Ordinarily only one of the two is illuminated at a time. Both are shown in one view to avoid needless duplication of drawing views.

In some cases the user will employ the separate command device to apply a "medium" setting for brightness. In this particular example, the medium setting is brighter than allowed by the local regulations and is therefore is a setting that creates a non-conforming projected beam. Looking again at FIG. 13, when the controller receives the "medium" state it switches off current control devices 86 and 92. The LEDs attached to those current control devices therefore become inactive. If the driver turns on the headlamps with the high beam selected, voltage will be provided to power supply 72 and voltage will be sensed on beam sense line 98. Controller 76 responds by switching on current control devices 88 and 90, thereby providing power to LED pairs 140 and 136. If the driver turns on the headlamps with the low beam selected, voltage will again be provided to power supply 76 but no voltage will be sensed on line 98. Controller 76 responds by switching on current control devices 84 and 86, thereby providing power to LED pairs 142 and 138.

Figure 25:
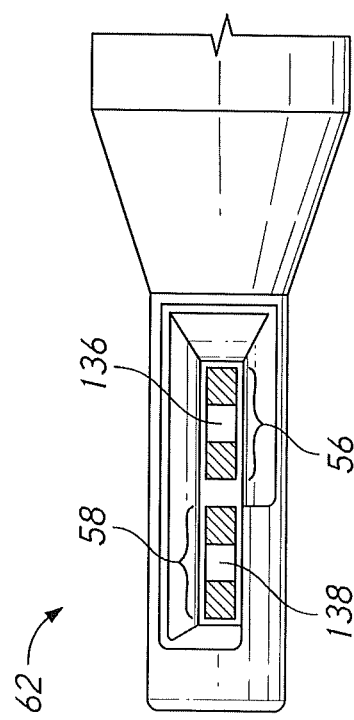
FIG. 25 is an elevation view, showing a medium illumination state for an inventive illumination source.

FIG. 25 shows these states. When the high beam is selected LEDs 136 and 140 are illuminated (All others are dark). When the low beam is selected LEDs 138 and 142 are selected (all others are dark). Once again only LEDs in the high beam array or the low beam array are illuminated at a time. Both are shown in FIG. 25 to avoid needless duplication of drawing views.

Continuing this example, the user will at some point select the "high" brightness setting. Looking again at FIG. 13, when the controller receives the "high" state it leaves all current control devise 82-92 active. If the driver turns on the headlamps with the high beam selected, voltage will be provided to power supply 72 and voltage will be sensed on beam sense line 98. Controller 76 responds by switching on current control devices 88-92, thereby providing power to LED pairs 140, 136, and 144. If the driver turns on the headlamps with the low beam selected, voltage will again be provided to power supply 76 but no voltage will be sensed on line 98. Controller 76 responds by switching on current control devices 82-86, thereby providing power to LED pairs 142, 138, and 146.

Figure 26:
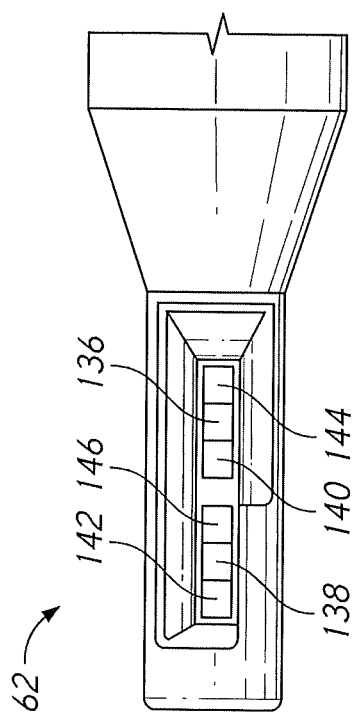
FIG. 26 is an elevation view, showing a high illumination state for an inventive illumination source.

The "high" brightness configuration is shown in FIG. 26. In this example the high setting is substantially beyond the regulatory brightness limits and this configuration therefore creates a non-conforming beam pattern.

In the preceding descriptions current control devices 82-92 have been described as simple on/off switches. They can also be more sophisticated devices that are able to vary the current passing through them over a continuous scale as well. FIG. 14 shows an alternate embodiment of illumination source 62. In this version a single current control device 96 is used to simultaneously control all the LEDs in high beam array 56. Likewise, a single current control device 95 is used to control all the LEDs in low beam array 58. Controller 76 controls the current control devices 95,96. The current carried in each of the two lines is varied over an available range as desired (The range may be subdivided into discrete steps such as 28 discrete steps). The example of FIG. 14 can provide a low, medium, and high brightness setting for the high beam and low beam arrays, but this is done by varying the current through a group of LEDs connected in parallel rather than discretely switching on and off individual LEDs.

FIG. 18 shows a variation of the Graphical User Interface that is particularly suited to a continuously variable brightness example. GUI 16 includes a slider for the low beam setting and a slider for the high beam setting. The user touches the slider's present location and moves it by moving the fingertip. Once the slider's location remains constant for a brief period, a new command is sent from the smartphone to illumination source 62. The illumination source responds by adjusting the brightness level to reflect the new input on the GUI.

The inventive illumination source can be packaged in a variety of ways and the invention is not limited to any physical packaging. FIG. 15 depicts an exemplary physical packaging, however, that may benefit the reader's understanding. In the example of FIG. 15, the LEDs are mounted on the lateral sides of frame 52. The reader will observe the position of high beam array 56 and low beam array 58. The illumination source 62 is configured to replace an existing bulb (such as a halogen bulb or prior art LED bulb) in a headlamp assembly. Prior art headlamp assemblies are usually designed to have the bulb inserted from the rear. The bulb is urged forward through a hole (generally in the reflector) until the bulb's base seats into a bulb mount on the headlamp assembly (Directional terms such as "rear" and "forward" refer to the orientation of the vehicle in which the bulb is mounted). Accordingly, base 24 is provided to the rear of frame 52 on the inventive illumination source 62. Base 62 includes conventional features configured to engage corresponding features on mount 20 in the headlamp assembly in order to lock the base into the mount. The mounting features are standard for a given type of bulb (such as H4 bulb, H7 bulb, etc.). Mounting features include locking lugs, tabs, etc. The invention is not limited to any particular type of mounting feature.

It is not necessary to house all the electronics of the inventive illumination source within frame 52. Accordingly — in the example shown — housing 102 is provided to the rear of base 24. It rests in an area immediately behind the headlamp assembly. Housing 102 contains the power supply, communication, and control electronics depicted in FIGS. 13 and 14. OEM harness connector 100 plugs into the OEM harness for the headlamp assembly in which the illumination source 62 is installed. Digital input 68 is provided through a flexible cord with a multi-conductor connector on its end. Analog inputs 70, 71 are likewise provided through a flexible cord with a connector on its end.

Fan 104 is provided to force cooling air through the assembly. The fan is preferably able to circulate air around frame 52 and the LEDs mounted thereon as well. In some examples the fan will run continuously whenever power is supplied over the OEM harness. In other examples a temperature sensor is provided and the fan is only run when it is needed. Such a sensor can be provided on frame 52 - particularly when the frame is made of thermally conductive material. In still other examples the fan can be configured to run whenever any of the LEDs are energized.

Returning briefly to FIG. 13, the reader will note that power to fan 104 is switched by controller 76. Temperature sensor 148 provides information to the controller through one of its I/O ports. Software running on the controller in this example uses the temperature sensor information to switch on and off current control device 81 - thereby controlling the fan.

In general the inventive illumination source will be controlled remotely - such as by using a smartphone application, using a vehicle's existing digital communications buses, using dedicated wiring, or using a vehicle's existing wiring. However, it is also possible to provide a user control on the illumination source itself. In the example of FIG. 15, a rotary selector knob 106 is provided on the top of housing 102.

The selector knob can be rotated to two or more positions. Each position is indicated by the alignment of a pointer 110 on the knob with a an indicator 108 on the housing. As one example, the two positions can simply be "on road" and "off road." When the user turns the knob to "on road" the illumination source provides a beam pattern that conforms to on-road illumination standards. When the user turns the knob to "off road" the illumination source provides a beam pattern that is brighter than the standard.

As another example, three positions can be provided for selector knob 106. The three positions are "on road," "off road - bright," and "off-road - wide." "Off road-bright" is a beam pattern similar to the conforming "on road" pattern but brighter. "Off road - wide" is a beam pattern that is much more widely dispersed. This latter pattern is useful when illuminating a work area while the vehicle is stationary.

The rotary selector knob shown in FIG. 15 works well for situations where there is good access to the top of housing 102 in the installed state. This will not always be the case. In some examples a selector switch can be provided on the side or the back of the housing. The selector can be a slide switch or a set of separate buttons. It is also possible to provide a rotary switch that can be engaged by a long screwdriver. The invention is not limited to any particular type or location of on-board selector.

If remote control is desired for the inventive illumination source, a wide variety of options exist. A simple option is radio control via the BLUETOOTH pairing discussed previously. A second option is the use of hard wiring. An installer can run wires from inside the vehicle to the analog inputs 70, 71 on the illumination source. The installer can provide a switch or switches at a convenient location — such as on the vehicle dash — that can be used to make or break circuits connected to the analog inputs 70, 71. In this example the user controls the illumination source by activating the switch or switches. For instance, a single switch can change the headlights from conforming (on road) to non-conforming (off road) settings. The on/off and high-beam/low-beam settings remain with the OEM vehicle switches in this configuration.

As a second option control of the inventive illumination source can be provided via an existing vehicle data bus. Vehicle data buses now commonly assume the form of Controller Area Network buses - commonly known as "CAN" buses. A CAN bus is typically created using two conductors - a CAN HI conductor and a CAN LO conductor. The two free ends of the CAN HI and CAN LO conductors are joined by a terminator resistor. The two conductors are run as a twisted pair to reduce unwanted emissions. The result is a parallel bus structure to which many devices can be tied. A message sent on this bus is sent to all devices attached to the bus. There is no routing. Thus, a CAN bus message structure typically includes an identifier specifying the device to which it is directed. Some nodes attached to the CAN bus may be complex devices -such as an integrated computer known as a Body Control Unit ("BCU"). Other nodes may be simple devices - such as a window drive motor controller and its associated position sensor.

There are many different standards in use for vehicle CAN buses. However, they all share some common traits. Any message placed on the CAN bus is transmitted to all nodes. Thus, some sort of addressing system is employed to "tell" all the recipients the specific node the message is intended for.

It is easy to attach additional devices to an existing CAN bus. The parallel structure means that there is virtually no limit to the number of devices that can be added (subject to an ultimate limit imposed by resistance losses). Thus, if there is a CAN bus segment running near the location of the inventive illumination source, the inventive illumination source can be connected into the CAN bus. Returning to the exemplary physical implementation of FIG. 15, a CAN bus connection can be provided by a short extension wiring harness. The first end of the extension harness plugs into digital input 68 and the second end is provided with a CAN connector suitable for the type of vehicle in which the invention is installed. Once the extension harness is connected the controller within the inventive illumination source can receive commands/messages placed on the CAN bus, and can also itself place commands/messages on the CAN bus.

With the CAN bus communications provided, numerous external devices can be used as a separate command device. Commonly-owned U.S. Pat. Application Serial No. 16/774,251 describes a car head unit including a touchscreen interface. The contents of Application Serial No. 16/774,251 are hereby incorporated by reference. The interface described in 16/774,251 allows a user to touch a command prompt on the screen and have the head unit generate a CAN bus command that is placed on the CAN bus and transmitted throughout the vehicle. Such an interface on a head unit can be used to control the inventive illumination device described in the present application. The head unit GUI can include a headlamp control screen that presents the user with a menu of touchscreen options. The user selects a desired option and the head unit then transmits a suitable command to the inventive illumination source via the CAN bus.

Figure 19:
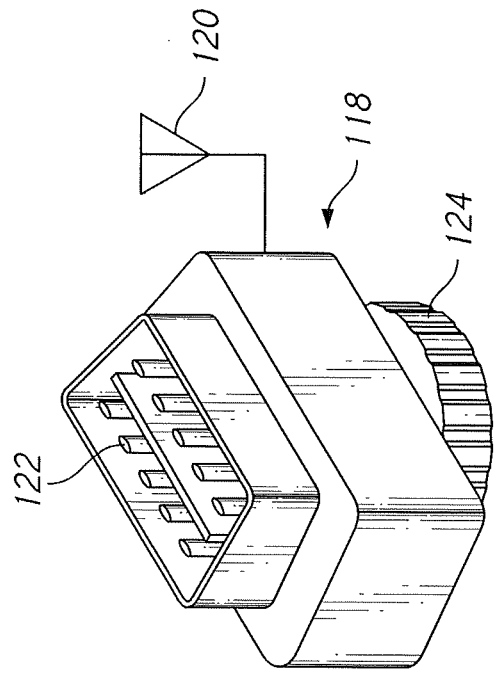
FIG. 19 is a perspective view, showing an OBD module that can be used to control the present invention.

Other techniques exist to create a CAN bus message - apart from the use of a stereo head unit. FIG. 19 shows another approach. Vehicles sold in the United States are now equipped with On-Board Diagnostic ports ("OBD" ports). These now conform to the "OBD-II" standard. In most vehicles the OBD-II port provides a direct connection to the vehicle's high-speed CAN bus (along with other connections). For such a vehicle the OBD-II port can be used to place commands/messages on the CAN bus and also receive commands/messages from the CAN bus.

FIG. 19 shows OBD module 118. This module includes an OBD plug 122 configured to plug into a vehicle's OBD port. The OBD module is configured to control the inventive illumination source via CAN bus messages. The OBD module is plugged into the vehicle's OBD port and left in place.

Rotary switch 124 is optionally provided on the OBD module. For many vehicles the OBD port is just behind the lower part of the dash. In those vehicles the user can easily reach down and turn rotary switch 124. When the position of rotary switch 124 is changed, the OBD module generates a CAN message directed to the illumination source, causing it to change from one mode to another. For instance, the rotary switch 124 could have on road (conforming) and off road (non-conforming) settings.

As another option, OBD module 118 can be provided with a wireless receiver and antenna 120. It could then receive wireless commands from a separate device - such as a smartphone. OBD module 118 would take these commands and place them on the CAN bus. The inventive illumination source would then receive the commands from the CAN bus and act upon them. Other methods of remote communication for the inventive illumination device will occur to those skilled in the art.

A significant aspect of the present invention is the fact that it can be switched between a conforming mode of operation and a non-conforming mode of operation. It is also possible to provide different types of non-conforming modes of operation. Some non-conforming modes will simply be a brighter version of a conforming beam pattern. These will have the same characteristics as conforming modes. As an example, conforming beam patterns do not tend to project light upwards. The low beam pattern has a distinct cut-off line that prevents significant light being projected greater than about 1 meter above the road surface. Even the high beam conforming pattern does not tend to project light significantly upward. This beam pattern explains why persons standing in front of the headlights of a parked vehicle tend to be illuminated only from the waist down.

The existence of a switchable illumination source (meaning switchable between conforming and non-conforming beam patterns) opens additional possibilities. As one example, a beam pattern can be created for the illumination of a work area. In this concept the vehicle is likely to be stationary. Light does not need to be projected as far as needed for driving. However, it is desirable to disperse the light to a greater degree and to eliminate the cut-off line.

Figure 20:
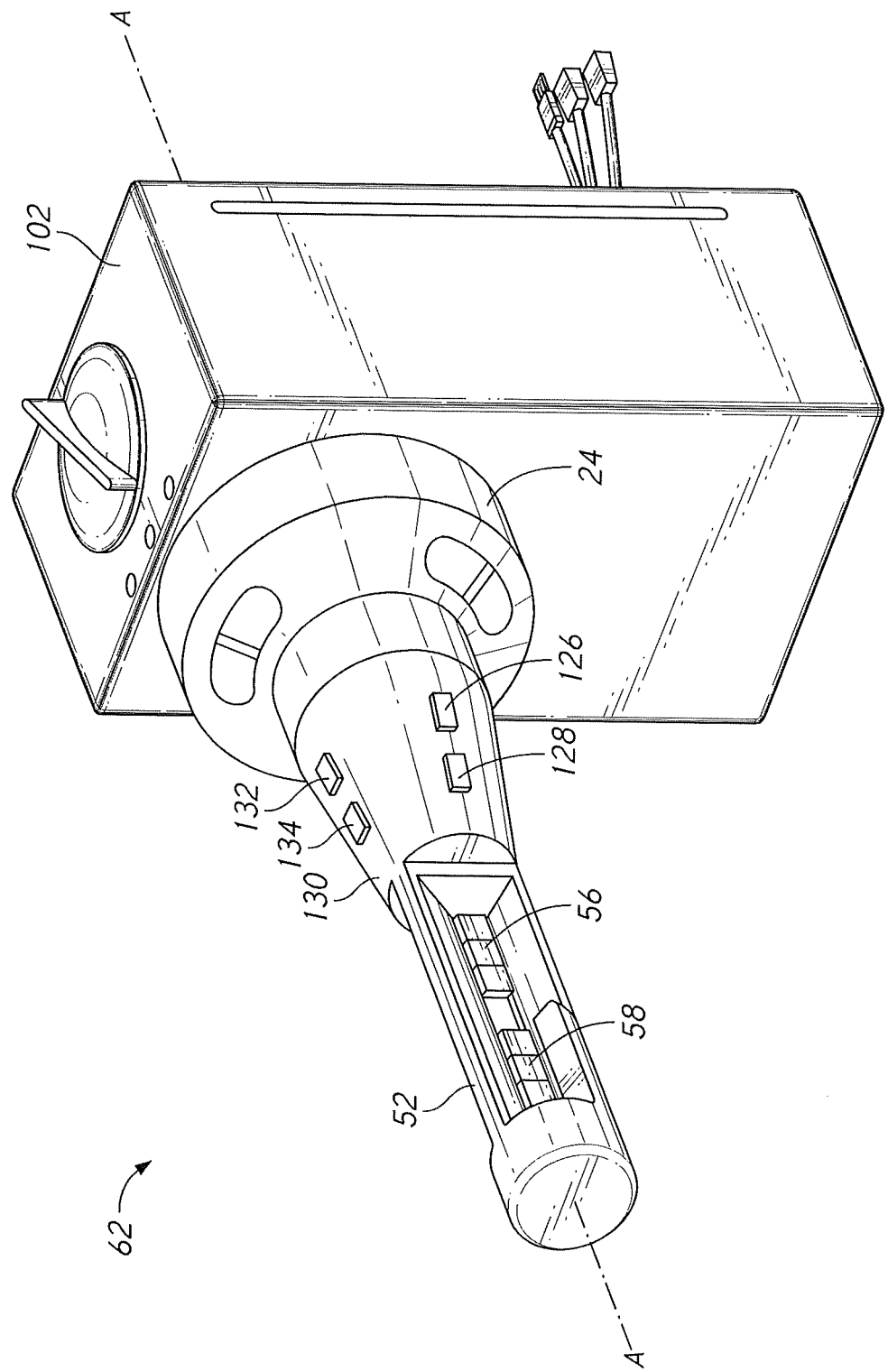
FIG. 20 is a perspective view, showing still another embodiment of the present invention.

FIGS. 20-23 illustrate an embodiment of the invention that provides this extra functionality. In the example of FIG. 20, frame 52 is similar to the version shown in FIG. 15. A high beam array 56 and low beam array 58 are provided on the lateral sides of the frame. However, additional LED chips are added in the shank region 130 of frame 52. In this example LED chips 126, 128 are added on the side facing the viewer. A corresponding pair of LED chips is added on the side facing away from the viewer. LED chips 132, 134 are added to the upward-facing surface of shank region 130. A corresponding set of LED chips are added to the downward-facing surface of the shank region.

Figure 21:
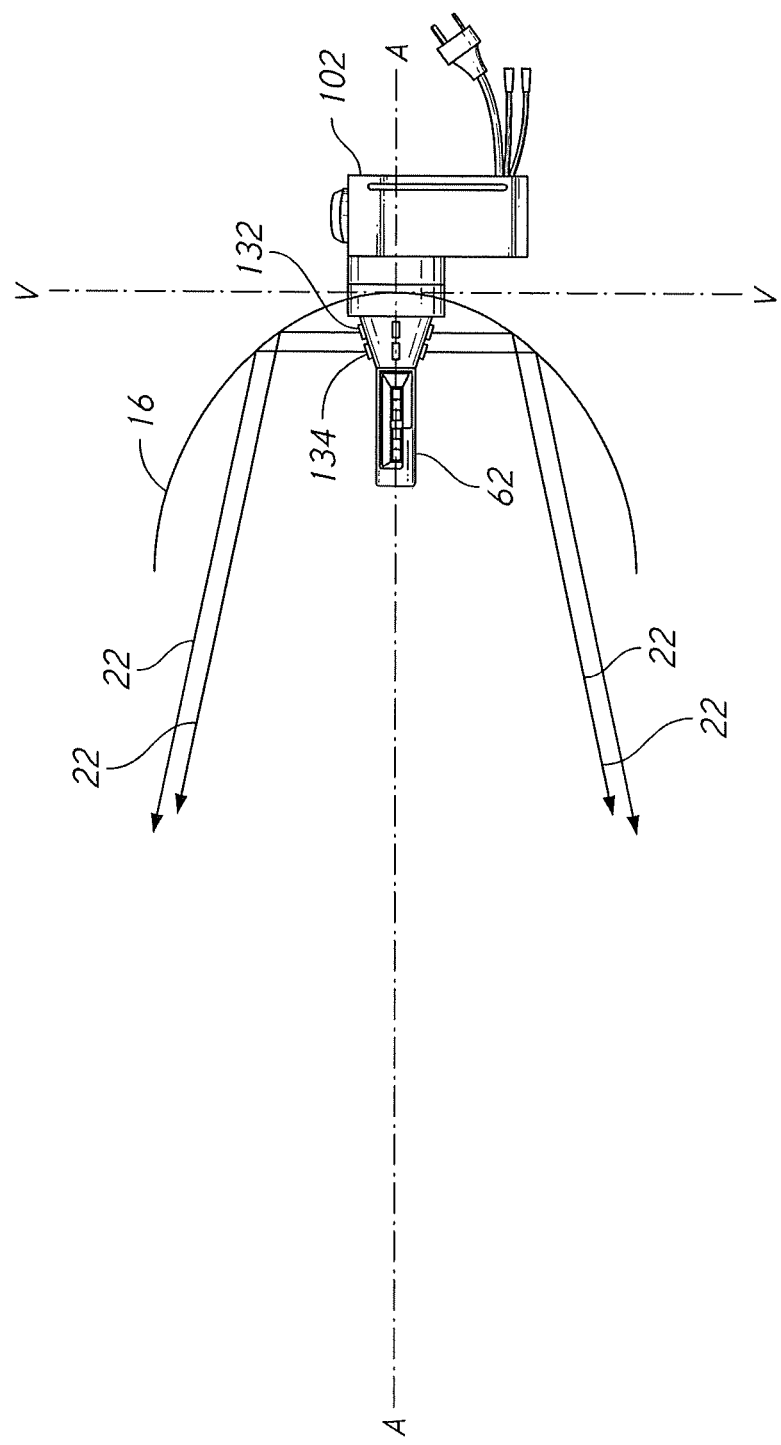
FIG. 21 is a sectional elevation view, showing the operation of the embodiment of FIG. 20.
Figure 22:
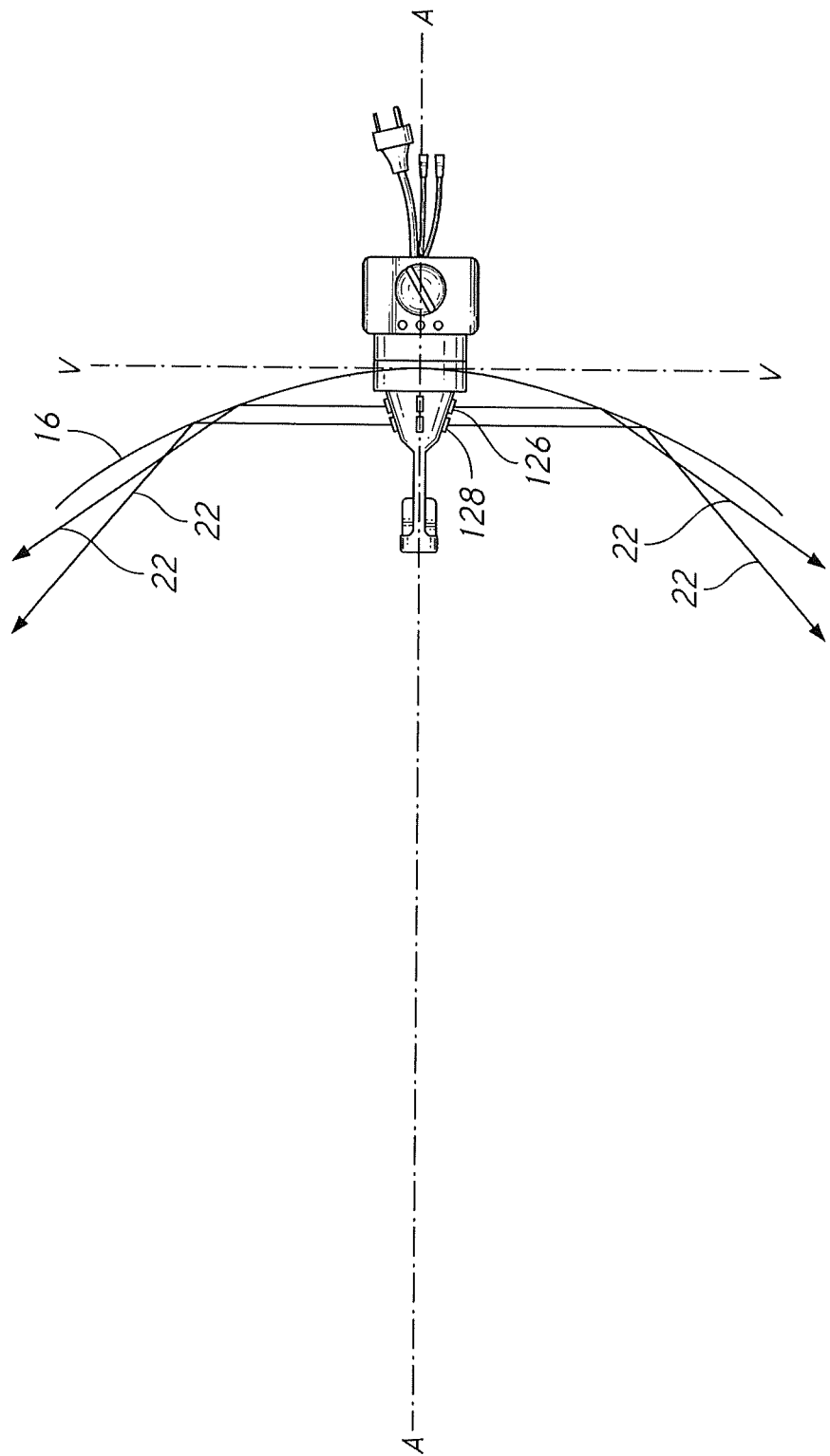
FIG. 22 is a sectional plan view, showing the operation of the embodiment of FIG. 20.

The LED chips added in the shank region are significantly rearward of the focus of the headlamp assembly's reflector. This is true for both reflector systems and for projector systems. The rearward location of these LED chips creates a wider dispersal of light. FIGS. 21 and 22 illustrate this phenomenon.

FIG. 21 provides an elevation view of the illumination source of FIG. 20 placed in a reflector system. LED chips 132, 134 are energized, along with corresponding LED chips on the bottom of the shank region of illumination source 62. Because these LED chips are rearward of the focus of reflector 16, light rays 22 diverge rather than exit the assembly in a parallel fashion.

FIG. 22 provides a plan view of the same configuration. This view shows how rays 22 produced by LED chips 126, 128 diverge significantly. In general, the reflectors used in headlamp assemblies disperse light horizontally more than vertically. This is true for the shank-mounted LED chips as well.

Figure 23:
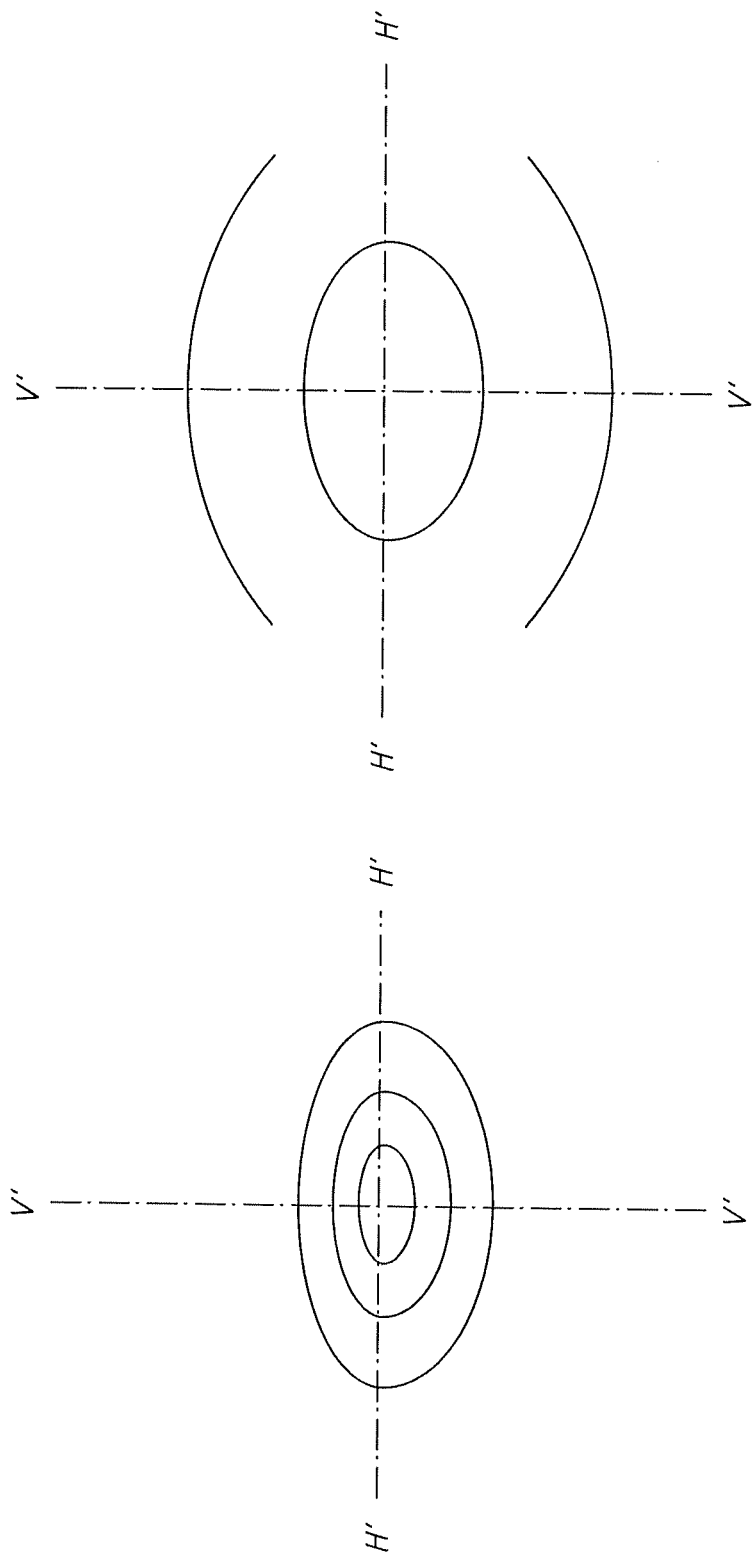
FIG. 23 is an elevation view, showing beam patterns produced by the embodiment of FIG. 20.

FIG. 23 provides a comparison between a conforming high beam pattern (on the left) and a much more widely dispersed pattern produced by activating the LED chips 126, 128, 132, 134 mounted to the rear of the focus. These rearward-mounted LED chips can be activated alone, or in combination with the high beam and/or low beam LED arrays mounted further forward on frame 52. The reader will note that the pattern on the right is much more widely dispersed.

In still other embodiments the separate command device for controlling the functions of the inventive illumination device can simply be the vehicle's light switches. Returning to the exemplary schematic of FIG. 13, the reader will recall that the inventive illumination source 62 is connected to the OEM harness via connector 64. The inventive illumination source can be configured to switch between different modes of operation in response to power pulses on the OEM harness. As a first example, switching the lights on and off three times in a three second interval could be interpreted as a command for controller 76 to change the mode of operation (such as toggling between conforming and non-conforming modes). As a second example, three quick pulses of the high beam could be interpreted as a command to change the mode of operation. This latter option is preferred as most vehicles have a momentary flash function on the high beams.

Additional optional embodiments include the following:
1. Using the emergency brake switch as a toggle controller to toggle the inventive illumination source between modes. A trigger line could be attached directly to the circuit of the emergency brake switch. Alternatively, a CAN message indicating the activation of the emergency brake could be used. A sequence of emergency brake activations is preferable in order to avoid unwanted toggling when the emergency brake is being used normally. As an example, three quick pulses of the emergency brake could be interpreted as a command to toggle the present state.

2. An LED driver with constant current reduction functionality can be provided - with the driver preferably being under the control of the controller.
3. Individual LED circuits can be separately energized by the LED driver.
4. Integrating a latched positive or negative trigger switch with the LED driver, that is connected to the positive source for the high beam circuit. Activation of the high beam circuit will switch the light to lumen level 2. Deactivation of the high beam circuit will return light to lumen level 1.
5. Integrating a Wi-Fi receiver controller with the LED driver, which receives activation/deactivation commands for lumen level 2 from a remotely power Wi-Fi transmitter.
6. Integrating a RF receiver controller with the LED driver, which receives activation/deactivation commands for lumen level 2 from a remotely powered RF transmitter.
7. Integrating a momentary cutoff switch between the driver output and the LEDs used for the non-conforming mode of operation. The cutoff switch is preferably activated via a remotely mounted photocell sensor. When oncoming light is detected by the photocell sensor, the non-conforming configuration is deactivated until the light is no longer present (The photocell sensor is a feature found on many new vehicles, such as the 2017 Ford Fusion Platinum).
8. Using some of the LEDs to provide a daytime running light function.
9. Providing a dedicated remote control as the separate command device.
10. For vehicles using only two power conductors to the headlamp assembly (positive and ground) and a digital input for control (such as a CAN bus input), configuring the controller 76 to read CAN messages in order to toggle between conventional high beam and low beam operations.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the following claims rather than the examples given.

We claim:

1. A removable illumination source configured to attach to a mount within a headlamp assembly of a vehicle, said vehicle including a power conductor and a ground conductor, said headlamp assembly including a reflector having a focus, comprising:
    (a) a plurality of light emitting diodes, mounted on a frame having a base configured to engage said mount and a shank region proximate said base;
    (b) driver circuitry configured to take in power from said power conductor of said vehicle and provide suitable power to drive said plurality of light emitting diodes;
    (c) a controller configured to control said driver circuitry in order to vary a light output of said plurality of light emitting diodes;
    (d) said controller being configured to wirelessly communicate with a separate command device so that said output of said plurality of light emitting diodes is responsive to a command sent by said separate command device;
    (e) a subset of said light emitting diodes being mounted on said shank region of said frame to the rear of said focus; and
    (f) said subset of said light emitting diodes being independently controllable by said controller.

2. The illumination source as recited in claim 1 wherein:
    (a) said controller varies said light output in order to create a first state and a second state;
    (b) said first state is a low beam or high beam headlight; and
    (c) said second state is an offroad light with higher angular dispersion.

3. The illumination source as recited in claim 2, wherein said second state is brighter than said first state.

4. The illumination source as recited in claim 1, wherein said plurality of light emitting diodes is configured to provide a high beam and a low beam.

5. The illumination source as recited in claim 4 wherein:
    (a) said controller varies said light output in order to create a first state and a second state for said high beam; and
    (b) said second state is an offroad light with higher angular dispersion.

6. The illumination source as recited in claim 4, wherein said plurality of light emitting diodes is configured to provide selective illumination in addition to said high beam and said low beam.

7. The illumination source as recited in claim 1, wherein said controller includes a processor running software.

8. A removable illumination source configured to attach to a mount within a headlamp assembly of a vehicle, said vehicle including a power conductor and a ground conductor leading to said mount, said headlamp assembly including a reflector having a focus, comprising:
    (a) a frame having a base configured to engage said mount and a shank region proximate said base;
    (b) a first set of light emitting diodes mounted on said frame proximate said focus of said reflector;
    (c) a second set of light emitting diodes mounted on said shank region of said frame to the rear of said focus;
    (d) driver circuitry configured to take in power from said power conductor of said vehicle and provide suitable power to drive said first and second sets of light emitting diodes;
    (e) a controller configured to control said driver circuitry in order to selectively provide power to said first set of light emitting diodes and selectively and independently provide power to said second set of light emitting diodes; and
    (f) said controller being configured to wirelessly communicate with a separate command device so that said operation of said controller is responsive to a command sent by said separate command device.

9. The illumination source as recited in claim 8 wherein:
    (a) said controller varies said light output of said first and second set of light emitting diodes in order to create a first state and a second state;
    (b) said first state is a low beam or high beam headlight; and
    (c) said second state is an offroad light with higher angular dispersion.

10. The illumination source as recited in claim 9, wherein said second state is brighter than said first state.

11. The illumination source as recited in claim 8, wherein said controller includes a processor running software.

12. A removable illumination source configured to attach to a mount within a headlamp assembly of a vehicle, said vehicle including a power conductor and a ground conductor, said headlamp assembly including a reflector having a focus, comprising:

(a) a frame having a base configured to engage said mount and a shank region proximate said base;
(b) a plurality of light emitting diodes mounted on said frame, with a subset of said plurality mounted on said shank region to the rear of said focus;
(c) driver circuitry configured to take in power from said power conductor of said vehicle and provide suitable power to drive said plurality of light emitting diodes;
(d) a controller configured to control said driver circuitry in order to change a light output of said plurality of light emitting diodes from a first state to a second state; and
(e) said controller being configured to wirelessly communicate with a separate command device so that a command sent by said separate command device causes said controller to change said light output of said light emitting diodes from said first state to said second state.

13. The illumination source as recited in claim 12 wherein:
(a) said controller varies said light output in order to create a first state and a second state;
(b) said first state is a low beam or high beam headlight; and
(c) said second state is an offroad light with higher angular dispersion.

14. The illumination source as recited in claim 13, wherein said second state is brighter than said first state.

15. The illumination source as recited in claim 12, wherein said plurality of light emitting diodes is configured to provide a high beam and a low beam.

16. The illumination source as recited in claim 15 wherein:
(a) said controller varies said light output in order to create a first state and a second state for said high beam; and
(b) said second state is an offroad light with higher angular dispersion.

* * * * *